United States Patent
Sun et al.

(10) Patent No.: US 9,728,783 B2
(45) Date of Patent: Aug. 8, 2017

(54) CATHODE ACTIVE MATERIAL FOR LITHIUM SECONDARY BATTERY, METHOD FOR MANUFACTURING SAME, AND LITHIUM SECONDARY BATTERY INCLUDING SAME

(75) Inventors: Yang-Kook Sun, Seoul (KR); Won-Gi Kim, Gyeonggi-do (KR); Seung-Min Oh, Gyeongsangbuk-do (KR)

(73) Assignee: INDUSTRY-UNIVERSITY COOPERATION FONDATION HANYANG UNIVERSITY, Seoul (KR)

( * ) Notice: Subject to any disclaimer, the term of this patent is extended or adjusted under 35 U.S.C. 154(b) by 707 days.

(21) Appl. No.: 13/885,939

(22) PCT Filed: Nov. 17, 2011

(86) PCT No.: PCT/KR2011/008809
§ 371 (c)(1),
(2), (4) Date: Aug. 26, 2013

(87) PCT Pub. No.: WO2012/067449
PCT Pub. Date: May 24, 2012

(65) Prior Publication Data
US 2013/0337327 A1 Dec. 19, 2013

(30) Foreign Application Priority Data
Nov. 17, 2010 (KR) .......................... 10-2010-0114657
Nov. 10, 2011 (KR) .......................... 10-2011-0117102

(51) Int. Cl.
| | | |
|---|---|---|
| H01M 4/58 | (2010.01) |
| H01M 4/04 | (2006.01) |
| H01M 4/525 | (2010.01) |
| H01M 4/505 | (2010.01) |
| H01M 4/485 | (2010.01) |
| H01M 4/54 | (2006.01) |
| H01M 4/1397 | (2010.01) |
| H01M 4/36 | (2006.01) |
| H01M 10/052 | (2010.01) |

(52) U.S. Cl.
CPC ....... *H01M 4/5825* (2013.01); *H01M 4/0471* (2013.01); *H01M 4/1397* (2013.01); *H01M 4/366* (2013.01); *H01M 4/485* (2013.01); *H01M 4/505* (2013.01); *H01M 4/525* (2013.01); *H01M 4/54* (2013.01); *H01M 10/052* (2013.01); *Y02E 60/122* (2013.01)

(58) Field of Classification Search
CPC .. H01M 4/5825; H01M 4/366; H01M 10/052; Y02E 60/122
See application file for complete search history.

(56) References Cited

U.S. PATENT DOCUMENTS

| 2008/0124630 A1* | 5/2008 | Kim | H01M 4/362 429/213 |
| 2011/0269023 A1* | 11/2011 | Kawakami | H01M 4/136 429/221 |
| 2012/0237833 A1* | 9/2012 | Guerfi | H01M 4/366 429/303 |

FOREIGN PATENT DOCUMENTS

| KR | 1020060130964 A | 12/2006 |
| KR | 100889622 B1 | 3/2009 |
| KR | 1020090082790 A | 7/2009 |
| KR | 1020100007236 A | 1/2010 |
| KR | 1020100052116 A | 5/2010 |
| WO | WO 2011/032264 * | 3/2011 |

OTHER PUBLICATIONS

International Search Report; mailed May 24, 2013; PCT/KR2011/008809.

* cited by examiner

*Primary Examiner* — Laura Weiner
(74) *Attorney, Agent, or Firm* — Ladas & Parry LLP; Loren K. Thompson

(57) ABSTRACT

The present invention relates to a cathode active material for a lithium secondary battery comprising: a core including a compound represented by chemical formula 1, and a shell including a compound represented by chemical formula 2, wherein the material composition of the core and the material composition of the shell are different; and a lithium secondary battery including the cathode active material for a lithium secondary battery.

11 Claims, 23 Drawing Sheets

CATHODE ACTIVE MATERIAL FOR LITHIUM SECONDARY BATTERY, METHOD FOR MANUFACTURING SAME, AND LITHIUM SECONDARY BATTERY INCLUDING SAME

FIELD OF THE INVENTION

The present disclosure relates to a cathode active material for a lithium secondary battery, a method for manufacturing the same, and a lithium secondary battery including the same.

BACKGROUND OF THE INVENTION

Batteries generate electrical power using an electrochemical reaction material for the cathode and anode. The examples of these batteries are lithium secondary batteries that generate electrical energy by chemical potential changes during intercalation/deintercalation of lithium ions at the cathode and anode.

The lithium secondary batteries include a material that reversibly intercalates and deintercalates lithium ions as both cathode and anode active materials, and are prepared by filling with an organic electrolyte or a polymer electrolyte between the cathode and the anode.

For the anode active material of lithium secondary batteries, many types of carbon-based materials, which enable intercalation and deintercalation of lithium ions, such as artificial graphite, natural graphite, hard carbon and the like have been applied.

For the cathode active material of lithium secondary batteries, lithium metal oxide composites are generally used, and the metal oxide composites such as $LiCoO_2$, $LiMn_2O_4$, $LiNiO_2$, $LiNi_{1-x}Co_xO_2$ ($0<x<1$), $LiMnO_2$, $LiFePO_4$ and the like have been studied.

SUMMARY OF THE INVENTION

One embodiment of the present invention is to provide a cathode active material for a lithium secondary battery having excellent output characteristic, capacity characteristic, thermal stability and life characteristic.

Another embodiment of the present invention is to provide a method for manufacturing the cathode active material for a lithium secondary battery.

Further another embodiment of the present invention is to provide a lithium secondary battery including the cathode active material for a lithium secondary battery.

According to one embodiment of the present invention, the cathode active material for a lithium secondary battery including:

a core including a compound represented by the following Chemical Formula 1; and a shell including a compound represented by the following Chemical Formula 2, wherein the material composition of the core and the material composition of the shell may be different:

$Li_{x1}M1_{y1}M2_{z1}PO_{4-w1}E_{w1}$ [Chemical Formula 1]

$Li_{x2}M3_{y2}M4_{z2}PO_{4-w2}E_{w2}$ [Chemical Formula 2]

wherein M1, M2, M3 and M4 may be identical or different from one another, and independently selected from the group consisting of Ni, Co, Mn, Fe, Na, Mg, Ca, Ti, V, Cr, Cu, Zn, Ge, Sr, Ag, Ba, Zr, Nb, Mo, Al, Ga, B and a combination thereof;

E may be selected from the group consisting of F, S and a combination thereof;

$0<x1\leq1.1$, $0\leq y1\leq1$, $0\leq z1\leq1$, $0<x1+y1+z1\leq2$;

$0\leq w1\leq0.5$;

$0<x2\leq1.1$, $0\leq y2\leq1$, $0\leq z2\leq1$, $0<x2+y2+z2\leq2$; and $0\leq w2\leq0.5$.

The M1 and the M3 may be elements that are identical to each other, the M2 and the M4 may be elements that are identical to each other, and at this time, x1, y1 and z1 may be x1=x2, y1<y2 and z1>z2. At this time, the M1 and the M3 may be selected from the group consisting of Fe, Co, Ni, Mn and a combination thereof, and the M2 and the M4 may be selected from the group consisting of Mn, Ni, Co, Fe and a combination thereof.

In the cathode active material for a lithium secondary battery, the M1 and the M3 may be elements that are different from each other. Further, the M2 and the M4 also may be elements that are different from each other.

The M1 and the M2 may be different from each other, and the core may have a structure in which the concentration of the M1 increases and the concentration of the M2 decreases as away from the center of the core; and at this time, the M1 may be selected from the group consisting of Fe, Co, Ni, Mn and a combination thereof, and the M2 may be selected from the group consisting of Mn, Ni, Co, Fe and a combination thereof.

The core may have a diameter of about 5 μm to about 20 μm.

The M3 and the M4 may be different from each other; the shell may have a structure in which the concentration of the M3 increases and the concentration of the M4 decreases as away from the interface of the core and the shell; the M3 may be selected from the group consisting of Fe, Co, Ni, Mn and a combination thereof; and the M4 may be selected from the group consisting of Mn, Ni, Co, Fe and a combination thereof.

The shell may have a thickness of about 100 nm to about 5 μm.

The cathode active material for a lithium secondary battery may further include a carbon-coated layer on the surface of the shell.

The carbon-coated layer may have a thickness of about 10 nm to about 200 nm.

The cathode active material for a lithium secondary battery may further include an intermediate layer between the core and the shell, and the intermediate layer may include a compound represented by the following Chemical Formula 3. At this time, the material composition of the intermediate layer is different from the material composition of the core and the material composition of the shell:

$Li_{x3}M5_{y3}M6_{z3}PO_{4-w3}E_{w3}$ [Chemical Formula 3]

wherein the M5 and the M6 may be identical or different from each other, and may be independently selected from the group consisting of Ni, Co, Mn, Fe, Na, Mg, Ca, Ti, V, Cr, Cu, Zn, Ge, Sr, Ag, Ba, Zr, Nb, Mo, Al, Ga, B and a combination thereof;

E may be selected from the group consisting of F, S and a combination thereof;

$0<x3\leq1.1$, $0\leq y3\leq1$, $0\leq z3\leq1$, $0<x3+y3+z3\leq2$; and $0\leq w3\leq0.5$.

The M1, the M3 and the M5 may be elements that are identical to one another, the M2, the M4 and the M6 may be elements that are identical to one another, and x1, y1 and z1 may be x1=x2=x3, y1<y3<y2 and z1>z3>z2. At this time, the M1, the M3 and the M5 may be selected from the group consisting of Fe, Co, Ni, Mn and a combination thereof; and the M2, the M4 and the M6 may be selected from the group consisting of Mn, Ni, Co, Fe and a combination thereof.

In the cathode active material for a lithium secondary battery, the M1, the M3 and the M5 may be elements that are different from one another. Further the M2, the M4 and the M6 also may be elements that are different from one another.

The M5 and the M6 may be different from each other; the intermediate layer may have a structure in which the concentration of M5 increases and the concentration of M6 decreases as away from the core; at this time, the M5 may be selected from the group consisting of Fe, Co, Ni, Mn and a combination thereof; and the M6 may be selected from the group consisting of Mn, Ni, Co, Fe and a combination thereof.

The intermediate layer may have a thickness of about 100 nm to about 24 μm.

The cathode active material for a lithium secondary battery may have a diameter of about 5 μm to about 25 μm, and a tap density of about 1 $g/cm^3$ to about 2 $g/cm^3$.

The method for manufacturing cathode active material for a lithium secondary battery according to another embodiment may include: forming a core precursor by mixing a M1 source, a M2 source and a phosphate source; forming a core-shell precursor comprising a shell precursor formed on the surface of the core precursor by mixing the core precursor with a M3 source, a M4 source and the phosphate source; forming a core-shell complex by heat-treating the core-shell precursor; and mixing the core-shell complex with a lithium source followed by calcining thereof.

The M1, the M2, the M3 and the M4 may be the same as described above.

The M1 source, the M2 source, the M3 source and the M4 source may independently include sulfur oxide, nitric oxide, acetic oxide, phosphate, chloride, oxalate, fluoride and carbonate of the M1, the M2, the M3 and the M4, or a combination thereof.

The phosphate source may include phosphoric acid ($H_3PO_4$), ammonium phosphate dibasic (($NH_4$)$_2HPO_4$), ammonium phosphate tribasic trihydrate (($NH_4$)$_3PO_4 \cdot 3H_2O$), metaphosphoric acid, orthophosphoric acid, ammonium dihydrogen phosphate ($NH_4H_2PO_4$) or a combination thereof.

The lithium source may include lithium phosphate ($Li_3PO_4$), lithium nitrate ($LiNO_3$), lithium acetate ($LiCH_3COO$), lithium carbonate ($Li_2CO_3$), lithium hydroxide (LiOH), lithium dihydrogenphosphate ($LiH_2PO_4$) or a combination thereof.

The heat-treating may be conducted at the temperature of about 300° C. to about 700° C.

The calcining may be conducted at the temperature of about 600° C. to about 800° C.

The method for manufacturing cathode active material for a lithium secondary battery may further include forming a carbon-coated layer on the surface of the core-shell complex after forming the core-shell complex.

The method for manufacturing cathode active material for a lithium secondary battery may further include forming an intermediate layer precursor on the surface of the core precursor by mixing the core precursor with a M5 source, a M6 source and a phosphate source after forming the core precursor.

The M5 and the M6 may be the same as described above.

The M5 source and the M6 source may independently include sulfur oxide, nitric oxide, acetic oxide, phosphate, chloride, oxalate, fluoride and carbonate of the M5 and the M6, or a combination thereof; and the phosphate source may be the same as described above.

The method for manufacturing cathode active material for a lithium secondary battery according to further another embodiment include: forming a core precursor by mixing a M1 source and a M2 source; forming a core-shell precursor comprising a shell precursor formed on the surface of the core precursor by mixing the core precursor with a M3 source and a M4 source; and mixing the core-shell precursor with a lithium source and a phosphate source followed by calcining thereof.

The M1, the M2, the M3, the M4, the M1 source, the M2 source, the M3 source, the M4 source, the phosphate source, the lithium source and the calcining may be the same as described above.

The method for manufacturing cathode active material for a lithium secondary battery may further include forming a carbon-coated layer on the surface of the core-shell precursor after forming the core-shell precursor.

The method for manufacturing cathode active material for a lithium secondary battery may further include forming an intermediate layer precursor on the surface of the core precursor by mixing the core precursor with a M5 source and a M6 source after forming the core precursor.

The M5, the M6, the M5 source and the M6 source may be the same as described above.

The further another embodiment provides a lithium secondary battery including: a cathode including the cathode active material; an anode including an anode active material; and an electrolyte.

Advantageous Effects of the Invention

The cathode active material for a lithium secondary battery according to one embodiment having a core-shell structure may have excellent output characteristic, capacity characteristic, thermal stability and life characteristic.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
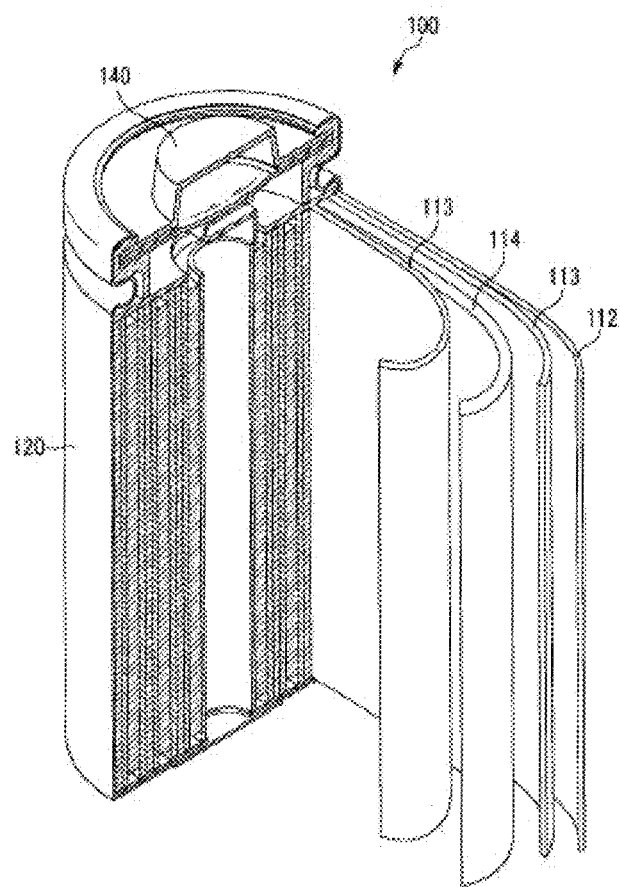
FIG. 1: a schematic drawing showing a structure of the lithium secondary battery according to one embodiment.

Hereinafter, embodiment of the present invention now will be described in detail. The embodiments are illustrative purposes only and are not to be construed to limit the scope of the present invention as defined in the following claims.

In the drawings, the thickness of layers and regions are exaggerated for clarity. Like reference numerals designate like elements throughout the specification.

It will be understood that when an element such as a layer, film, region or substrate is referred to as being "on" another element, it can be directly on the other element or intervening elements may also be present. In contrast, when an element is referred to as being "directly on" another element, there are no intervening elements present.

According to one embodiment, the cathode active material for a lithium secondary battery including: a core including a compound represented by the following Chemical Formula 1; and a shell including a compound represented by the following Chemical Formula 2. At this time, the material composition of the core and the material composition of the shell may be different. Namely, in the following Chemical Formulas 1 and 2, there is no case that M1=M3, y1=y2, M2=M4, z1=z2 and w1=w2, and M2=M3, z1=y2, M1=M4, y1=z2 and w1=w2:

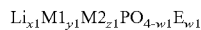  [Chemical Formula 1]

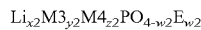  [Chemical Formula 2]

In the Chemical Formulas 1 and 2, M1, M2, M3 and M4 may be identical or different from one another, and independently selected from the group consisting of Ni, Co, Mn, Fe, Na, Mg, Ca, Ti, V, Cr, Cu, Zn, Ge, Sr, Ag, Ba, Zr, Nb, Mo, Al, Ga, B and a combination thereof, specifically selected from the group consisting of Ni, Co, Mn, Fe, Mg, Al, Zn, Mo and a combination thereof.

E may be selected from the group consisting of F, S and a combination thereof, and specifically it may be F.

$0<x1\le1.1$, $0\le y1\le1$, $0\le z1\le1$, $0<x1+y1+z1\le2$, and specifically it may be $0.9<x1\le1.1$, $0\le y1\le1$, $0\le z1\le1$, $0.9<x1+y1+z1\le2$.

$0\le w1\le0.5$, and specifically, it may be $0\le w1\le0.3$.

$0<x2\le1.1$, $0\le y2\le1$, $0\le z2\le1$, $0<x2+y2+z2\le2$, and specifically, it may be $0.9<x2\le1.1$, $0\le y2\le1$, $0\le z2\le1$, $0.9<x2+y2+z2\le2$.

$0\le w2\le0.5$, and specifically, it may be $0\le w2\le0.3$.

The cathode active material for a lithium secondary battery including the core and the shell may improve various physical properties of a lithium secondary battery multiply and effectively. For example, when using materials having high voltage characteristic and high energy density as the core and materials having excellent thermal stability and life characteristic as the shell, the lithium secondary battery including the cathode active material for a lithium secondary battery may improve the thermal stability and the life characteristic as well as the output characteristic and the capacity characteristic, but not limited thereto. The materials constituting the core and the materials constituting the shell may be identical or different from one another, and each of them may selectively include materials having various chemical and physical properties. Accordingly, the cathode active material for a lithium secondary battery may have an advantage that it may effectively achieve the desired various physical properties.

The core and the cathode active material for a lithium secondary battery may be spherical, oval or a combination thereof, but not limited thereto.

As one example, the M1 and the M3 may be the same material, and the M2 and the M4 may be the same material. At this time, it may satisfy x1=x2, y1<y2 and z1>z2. In this case, the core and the shell may include the same material, but the concentrations of the materials contained in the core and the shell, i.e., material compositions may be different. Accordingly, defects of each material composition, for example, low redox potential, low discharging capacity, poor life characteristic, poor thermal stability and the like may be overcome by forming a core-shell structure with other material composition, and thereby a cathode active material for a lithium secondary battery, which can effectively display only advantages of each material composition, may be manufactured.

At this time, the M1 and the M3 may be selected from the group consisting of Fe, Co, Ni, Mn and a combination thereof, and the M2 and the M4 may be selected from the group consisting of Mn, Ni, Co, Fe and a combination thereof, but not limited thereto. The high voltage characteristic is excellent in order of Ni>Co>Mn>Fe, and the thermal stability and the life characteristic are excellent in order of Fe>Co>Mn>Ni. Thus, if the materials contained in the core and the shell are properly selected in consideration of the said characteristics, the high voltage characteristic, the thermal stability and the life characteristic may be effectively improved. For example, the combination of (M1,M2) may be (Fe,Mn), (Co,Ni), (Ni,Co), (Mn,Fe), (Ni,Fe), (Ni,Co) and the like, and the combination of (M3,M4) may be (Fe,Mn), (Co,Ni), (Ni,Co), (Mn,Fe), (Ni,Fe), (Ni,Co) and the like, but not limited thereto.

Specifically, the M1 and the M3 may be Fe and y1=0, and the M2 and the M4 may be Mn and z2=0. In this case, the core may become a lithium-manganese-phosphate complex so as to improve the high voltage characteristic and increase the energy density, and the shell may become a lithium-iron-phosphate complex so as to display excellent thermal stability and life characteristic. Consequently, the cathode active material for a lithium secondary battery may have excellent output characteristic and capacity characteristic, and excellent thermal stability and life characteristic at the same time.

As another example, the M1 and the M3 may be materials different from each other, and the M2 and the M4 may be materials different from each other. Specifically, the M1, the M2, the M3 and the M4 may be different from each other. At this time, the M1 to M4 may be independently selected from the group consisting of Fe, Co, Ni, Mn and a combination thereof, but not limited thereto. Specifically, the combination of (M1,M2) as the material contained in the core may be (Ni,Co), (Ni,Mn), (Co,Mn), (Ni,Co), (Ni,Mn), (Co,Mn) and the like, and the combination of (M3,M4) contained in the shell may be (Fe,Mn), (Fe, Co), (Fe,Ni), (Mn,Fe), (Co,Fe), (Ni,Fe) and the like, but not limited thereto. In this case, the core may improve the high voltage characteristic and increase the energy density, and the shell may improve the thermal stability and the life characteristic. Consequently, the cathode active material for a lithium secondary battery including the said core and shell may have excellent output characteristic, capacity characteristic, thermal stability and life characteristic.

On the other hand, in the cathode active material for a lithium secondary battery, the M1 and M2 may be different from each other, and the core may have a structure in which the concentration of the M1 increases and the concentration of the M2 decreases as away from the center of the core. The concentration change may be continuous, but not limited thereto. The concentration change may be discontinuous, and at this time, the core may be formed as a multi-layered structure. Of course, the said structure may be applied to the case that the materials constituting the core and the materials constituting the shell are different as well as the case that the materials constituting the core and the materials constituting the shell are identical. At this time, the M1 may be selected from the group consisting of Fe, Co, Ni, Mn and a combination thereof, and the M2 may be selected from the group consisting of Mn, Ni, Co, Fe and a combination thereof, but not limited thereto. In the core, the concentrations of the M1 and the M2 are changed as mentioned above, a stable crystalline structure may be obtained by controlling the material composition of the core not to be changed rapidly, and defects of each electrochemical characteristics of the different materials constituting the core may be compensated, and advantages of each electrochemical characteristics of the different materials constituting the core may be multiply displayed. Further, the production of impurities may be prevented or reduced by controlling the material composition at an adjacent part of the shell not to have significant difference.

The core may have a diameter of about 5 to about 20 μm. When the diameter is within the said range, the core-shell complex may be easily formed, and electrochemical characteristics may be effectively improved. Specifically, the core may have the diameter of about 7 to about 15 μm.

In the cathode active material for a lithium secondary battery, the M3 and the M4 may be different from each other, and the shell may have a structure in which the concentration of the M3 increases and the concentration of the M4 decreases as away from the interface of the core and the shell. The concentration change may be continuous, but not limited thereto. The concentration change may be discontinuous, and at this time, the shell may be formed as a multi-layered structure. Of course, the said structure may be applied to the case that the materials constituting the core and the materials constituting the shell are different as well as the case that the materials constituting the core and the materials constituting the shell are identical. At this time, the M3 may be selected from the group consisting of Fe, Co, Ni, Mn and a combination thereof, and the M4 may be selected from the group consisting of Mn, Ni, Co, Fe and a combination thereof, but not limited thereto. In the shell, the concentrations of the M3 and the M4 are changed as mentioned above, a stable crystalline structure may be obtained by controlling the material composition of the shell not to be changed rapidly, and defects of each electrochemical characteristics of the different materials constituting the shell may be compensated, and advantages of each electrochemical characteristics of the different materials constituting the shell may be multiply displayed. Further, the production of impurities may be prevented or reduced by controlling the material composition at an adjacent part of the core not to have significant difference.

The shell may have a thickness of about 100 nm to about 5 μm. When the thickness is within the said range, a core-shell complex may be formed while keeping the morphology of the core-shell complex, and the electrochemical characteristics of the cathode active material for a lithium secondary battery including the core may be effectively improved by effectively compensating the electrochemical characteristics of the core. Specifically, the shell may have the thickness of about 200 nm to about 3 μm.

The cathode active material for a lithium secondary battery may further include a carbon-coated layer on the surface of the shell. The cathode active material for a lithium secondary battery further including the carbon-coated layer has improved electric conductivity, thereby having excellent electrochemical characteristics.

The carbon-coated layer may have a thickness of about 10 nm to about 200 nm. When the thickness of the carbon-coated layer is within the said range, the electric conductivity may be effectively improved, and accordingly, the cathode active material for a lithium secondary battery including thereof may have excellent electrochemical characteristics. Specifically, the carbon-coated layer may have the thickness of about 15 nm to about 100 nm.

In the cathode active material for a lithium secondary battery, the core and the shell are separately described, but not limited thereto. When the materials contained in the core and the shell are same and the materials contained in the core and the shell is distributed by continuous concentration gradient, in the cathode active material for a lithium secondary battery, the boundaries between the core, the intermediate layer and the shell may not be distinguished and it may exist in the form of single particle.

The cathode active material for a lithium secondary battery may further include an intermediate layer between the core and the shell, and the material composition of the intermediate layer may be different from the material composition of the core and the material composition of the shell. At this time, the intermediate layer may include a compound represented by the following Chemical Formula 3:

$$Li_{x3}M5_{y3}M6_{z3}PO_{4-w3}E_{w3}$$ [Chemical Formula 3]

wherein the M5 and the M6 may be identical or different from each other, and may be independently selected from the group consisting of Ni, Co, Mn, Fe, Na, Mg, Ca, Ti, V, Cr, Cu, Zn, Ge, Sr, Ag, Ba, Zr, Nb, Mo, Al, Ga, B and a combination thereof, specifically selected from the group consisting of Ni, Co, Mn, Fe, Mg, Al, Zn, Mo and a combination thereof.

E may be selected from the group consisting of F, S and a combination thereof, and specifically, it may be F.

$0 < x3 \leq 1.1$, $0 \leq y3 \leq 1$, $0 \leq z3 \leq 1$, $0 < x3+y3+z3 \leq 2$, and specifically, it may be; and $0.9 < x3 \leq 1.1$, $0.1 \leq y3 \leq 0.9$, $0.1 \leq z3 \leq 0.9$, $1.1 < x3+y3+z3 \leq 2$.

$0 \leq w3 \leq 0.5$, and specifically, it may be $0 \leq w3 \leq 0.3$.

As one example, the M1, the M3 and the M5 may be the same material, and the M2, the M4 and the M6 may be the same material, and at this time, it may satisfy x1=x2=x3, y1<y3<y2 and z1>z3>z2. In this case, the core, the intermediate layer and the shell may include the same material, but the concentrations of the materials contained in the core, the intermediate layer and the shell, i.e., material compositions may be different. When there is the intermediate layer, and the intermediate layer has the said composition, the production of impurities, which may be generated by significant difference between the compositions of the core and the shell, may be prevented or reduced, and the crystalline structure may be stabilized because there is not sharp phase boundary.

At this time, the M1, the M3 and the M5 may be selected from the group consisting of Fe, Co, Ni, Mn and a combination thereof, and the M2, the M4 and the M6 may be selected from the group consisting of Mn, Ni, Co, Fe and a combination thereof, but not limited thereto. For example, the combination of (M1,M2) may be (Fe,Mn), (Co,Ni), (Ni,Co), (Mn,Fe), (Ni,Fe), (Ni,Co) and the like, and the combination of (M3,M4) may be (Fe,Mn), (Co,Ni), (Ni,Co), (Mn,Fe), (Ni,Fe), (Ni,Co) and the like. Further, the combination of (M5,M6) may be (Fe,Mn), (Co,Ni), (Ni,Co), (Mn,Fe), (Ni,Fe), (Ni,Co) and the like.

Specifically, the M1, the M3 and the M5 may be Fe and y1=0, and the M2, the M4 and the M6 may be Mn and z2=0. In this case, the core may become a lithium-manganese-phosphate complex so as to improve the high voltage characteristic and increase the energy density, the intermediate layer may become a lithium-iron-manganese-phosphate complex so as to reduce the sharp difference between the compositions of the core and the shell, and the shell may become a lithium-iron-phosphate complex so as to display excellent thermal stability and life characteristic. Consequently, the cathode active material for a lithium secondary battery including the core, the intermediate layer and the shell may have a stable crystalline structure, excellent output characteristic and capacity characteristic, and excellent thermal stability and life characteristic at the same time.

As another example, the M1, the M3 and the M5 may be the materials different from each other, and the M2, the M4 and the M6 may be the materials different from each other. At this time, the M1 to M6 may be independently selected from the group consisting of Fe, Co, Ni, Mn and a combination thereof, but not limited thereto. Specifically, the combination of (M1,M2) as the material contained in the core may be (Ni,Co), (Ni,Mn) and the like, and the combination of (M3,M4) contained in the shell may be (Mn,Fe), (Co,Fe) and the like, but not limited thereto. In this case, the core may improve the high voltage characteristic and increase the energy density, and the shell may improve the thermal stability and the life characteristic. The intermediate layer may compensate the electrochemical characteristics of the core and the shell. Consequently, the cathode active material for a lithium secondary battery including the said core, intermediate layer and shell may have excellent output characteristic, capacity characteristic, thermal stability and life characteristic.

On the other hand, in the cathode active material for a lithium secondary battery, the M5 and the M6 may be different from each other, and the intermediate layer may have a structure in which the concentration of the M5 increases and the concentration of the M6 decreases as away from the center of the core. The concentration change may be continuous, but not limited thereto. The concentration change may be discontinuous, and at this time, the intermediate layer may be formed as a multi-layered structure. Of course, the said structure may be applied to the case that the materials constituting the core, the materials constituting the shell and the materials constituting the intermediate layer are different as well as the case that the materials constituting the core, the materials constituting the shell and the materials constituting the intermediate layer are identical. At this time, the M5 may be selected from the group consisting of Fe, Co, Ni, Mn and a combination thereof, and the M6 may be selected from the group consisting of Mn, Ni, Co, Fe and a combination thereof, but not limited thereto. In the intermediate layer, the concentrations of the M5 and the M6 are changed as mentioned above, a stable crystalline structure may be obtained by controlling the material composition of the intermediate layer not to be changed rapidly, and defects of each electrochemical characteristics of the different materials constituting the intermediate layer may be compensated, and advantages of each electrochemical characteristics of the different materials constituting the intermediate layer may be multiply displayed. Further, the production of impurities may be prevented or reduced by controlling the material composition at an adjacent part of the core not to have significant difference from the material composition of the core, and controlling the material composition at an adjacent part of the shell not to have significant difference from the materials composition of the shell.

The intermediate layer may have a thickness of about 100 nm to about 24 μm. When the thickness of the intermediate layer is within the said range, the production of impurities, which may be generated by significant difference between the compositions of the core and the shell, may be prevented or reduced, and the crystalline structure may be stabilized because there is not sharp phase boundary. Specifically, the intermediate layer may have the thickness of about 1 μm to about 20 μm.

In the cathode active material for a lithium secondary battery, the core, the intermediate layer and the shell are separately described, but not limited thereto. When the materials contained in the core, the intermediate layer and the shell are same and the materials contained in the core, the intermediate layer and the shell is distributed by continuous concentration gradient, in the cathode active material for a lithium secondary battery, the boundaries between the core, the intermediate layer and the shell may not be distinguished and it may exist in the form of single particle.

In the above, various examples of the cathode active material for a lithium secondary battery have been described, but not limited thereto.

The cathode active material for a lithium secondary battery may have a diameter of about 5 μm to about 25 μm. When the diameter of the cathode active material for a lithium secondary battery is within the said range, the energy density may be effectively improved due to excellent tap density. Specifically, the cathode active material for a lithium secondary battery may have the diameter of about 5 μm to about 15 μm.

The cathode active material for a lithium secondary battery may have the tap density of about 1 g/cm$^3$ to about 2 g/cm$^3$. When the tap density of the cathode active material for a lithium secondary battery is within the said range, the energy density may be effectively improved. Specifically, the cathode active material for a lithium secondary battery may have the tap density of about 1.2 g/cm$^3$ to about 1.7 g/cm$^3$, and more specifically, the tap density of about 1.5 g/cm$^3$ to about 1.7 g/cm$^3$.

The method for manufacturing cathode active material for a lithium secondary battery according to another embodiment includes: forming a core precursor by mixing an M1 source, a M2 source and a phosphate source; forming a core-shell precursor comprising a shell precursor formed on the surface of the core precursor by mixing the core precursor with a M3 source, a M4 source and the phosphate source; forming a core-shell complex by heat-treating the core-shell precursor; and mixing the core-shell complex with a lithium source followed by calcining thereof. Unless otherwise stated, the M1, M2, M3 and M4 are the same as described above.

The M1 source, the M2 source, the M3 source and the M4 source may include sulfur oxide, nitric oxide, acetic oxide, hydroxide, chloride, oxalate, fluoride and carbonate of the M1, the M2, the M3 and the M4, or a combination thereof, respectively.

The phosphate source may include phosphoric acid ($H_3PO_4$), ammonium phosphate dibasic (($NH_4$)$_2HPO_4$), ammonium phosphate tribasic trihydrate (($NH_4$)$_3PO_4 \cdot 3H_2O$), metaphosphoric acid, orthophosphoric acid, ammonium dihydrogen phosphate ($NH_4H_2PO_4$) or a combination thereof.

In the method for manufacturing cathode active material for a lithium secondary battery, the core precursor and the shell precursor may be formed in the form of phosphate, oxalate, carbonate, hydroxide or a combination thereof. Specifically, the core precursor and the shell precursor may be formed in the form of phosphate, hydroxide or a combination thereof, respectively.

When heat-treating the core-shell precursor, moisture and remained organic materials may be removed from the core-shell precursor, thereby forming a core-shell complex.

In forming the core-shell complex by heat-treating the core-shell precursor, the heat-treating may be conducted at the temperature of about 300° C. to about 700° C. for about 1 hour to about 20 hours. When the heat-treating is conducted under the said condition, moisture and remained organic materials may be removed from the core-shell precursor, thereby easily forming a core-shell complex, and the electrochemical characteristics of the cathode active material for a lithium secondary battery formed from the core-shell complex by increasing the crystallinity of the formed core-shell complex. Specifically, the heat-treating may be conducted at the temperature of about 400° C. to about 650° C. for about 5 hours to about 15 hours.

The temperature rising speed when heat-treating, may be about 1° C./min to about 10° C./min. When the temperature rising speed is within the said range, the formed core-shell complex may have homogeneous crystallinity, and accordingly, an olivine type cathode active material for a lithium secondary battery may be effectively formed without the production of impurities. Specifically, the temperature rising speed when heat-treating may be about 2° C./min to about 5° C./min.

The lithium source may include lithium phosphate ($Li_3PO_4$), lithium nitrate ($LiNO_3$), lithium acetate ($LiCH_3COO$), lithium carbonate ($Li_2CO_3$), lithium hydroxide (LiOH), lithium dihydrogenphosphate ($LiH_2PO_4$) or a combination thereof, but not limited thereto. The phosphate source may be the same as described above.

The core-shell complex and the lithium source may be mixed in a molar ration of about 1:0.8 to about 1:1.2. The molar ratio of the mixed core-shell complex and the lithium source is within the said range, an olivine type cathode active material for a lithium secondary battery can be effectively obtained with a stable structure, and the cathode active material for a lithium secondary battery may have excellent electrochemical characteristics because it does not produce impurities. Specifically, the core-shell complex and the lithium source may be mixed in a molar ratio of about 1:0.9 to about 1:1.1.

In mixing the lithium source with the core-shell complex followed by calcining thereof, the calcining may be conducted at the temperature of about 600° C. to about 800° C. for about 5 hours to about 20 hours. When the calcining is conducted under the said condition, the crystallinity of the formed cathode active material for a lithium secondary battery may be improved, and the cathode active material for a lithium secondary battery having excellent electrochemical characteristics may be obtained because impurities are not produced. Specifically, the calcining may be conducted at the temperature of about 650° C. to about 750° C. for about 10 hours to about 15 hours.

The temperature rising speed when calcining, may be about 1° C./min to about 10° C./min. When the temperature rising speed is within the said range, the crystallinity of the formed cathode active material for a lithium secondary battery may be improved, and the cathode active material for a lithium secondary battery having excellent electrochemical characteristics may be obtained because impurities are not produced. Specifically, the temperature rising speed when calcining may be about 2° C./min to about 5° C./min.

The method for manufacturing cathode active material for a lithium secondary battery may further include forming a carbon-coated layer on the surface of the core-shell complex after forming the core-shell complex. Specifically, the carbon-coated layer may be formed by mixing a carbon source such as pitch carbon, sucrose, glucose, polyvinylalcohol, polypyrrole, cellulose, acetylene black, super-p with the core-shell complex followed by calcining thereof.

Further, when conducting the step of forming the core precursor, the step of forming the core-shell precursor or a combination thereof, carbon may be introduced to the core precursor, the core-shell precursor or a combination thereof by further mixing the said carbon source. At this time, the electric conductivity of the formed cathode active material for a lithium secondary battery may be improved.

On the other hand, the method for manufacturing the cathode active material for a lithium secondary battery may further include forming an intermediate layer precursor on the surface of the core precursor by mixing the core precursor with a M5 source, a M6 source and a phosphate source after forming the core precursor. The intermediate layer precursor may become an intermediate layer through the following heat-treating and calcining. Unless otherwise stated, the M5 and the M6 may be the same as described above.

The intermediate layer precursor may be formed by mixing and reacting the M5 and the M6 sources including sulfur oxide, nitric oxide, acetic oxide, hydroxide, chloride, oxalate, fluoride and carbonate of the M5 and the M6, or a combination thereof, and the phosphate source with the core precursor, but not limited thereto. The phosphate source may be the same as described above.

The intermediate layer precursor may be formed in the form of phosphate, oxalate, carbonate, hydroxide or a combination thereof. Specifically, the intermediate layer precursor may be formed in the form of phosphate, hydroxide or a combination thereof.

According to further another embodiment, the method for manufacturing the cathode active material for a lithium secondary battery include: forming a core precursor by mixing a M1 source and a M2 source; forming a core-shell precursor comprising a shell precursor formed on the surface of the core precursor by mixing the core precursor with a M3 source and a M4 source; and mixing the core-shell precursor with a lithium source and a phosphate source followed by calcining thereof.

Unless otherwise stated, the M1, the M2, the M3, the M4, the M1 source, the M2 source, the M3 source, the M4 source, the phosphate source and the lithium source may be the same as described above.

In the method for manufacturing the cathode active material for a lithium secondary battery, the core precursor and the shell precursor may be formed in the form of phosphate, oxalate, carbonate, hydroxide or a combination thereof, respectively. Specifically, the core precursor and the shell precursor may be formed in the form of oxalate, carbonate or a combination thereof, respectively.

In mixing the core-shell precursor with the lithium source and the phosphate source followed by calcining thereof, the core-shell precursor and the lithium source may be mixed in a molar ratio of about 1:0.8 to about 1:1.2. When the molar ratio of the mixed core-shell precursor and the lithium source is within the said range, an olivine type cathode active material for a lithium secondary battery can be effectively obtained with a stable structure, and the cathode active material for a lithium secondary battery may have excellent electrochemical characteristics because it does not produce impurities. Specifically, the core-shell precursor and the lithium source may be mixed in a molar ratio of about 1:0.9 to about 1:1.1.

In mixing the core-shell precursor with the lithium source and the phosphate source followed by calcining thereof, the calcining may be conducted at the temperature of about 600° C. to about 800° C. for about 5 hours to about 20 hours. When the calcining is conducted under the said condition, the crystallinity of the formed cathode active material for a lithium secondary battery may be improved, and the cathode active material for a lithium secondary battery having excellent electrochemical characteristics may be obtained because impurities are not produced. Specifically, the calcining may be conducted at the temperature of about 650° C. to about 750° C. for about 10 hours to about 15 hours.

The temperature rising speed when calcining may be about 1° C./min to about 10° C./min. When the temperature rising speed is within the said range, the crystallinity of the formed cathode active material for a lithium secondary battery may be improved, and the cathode active material for a lithium secondary battery having excellent electrochemical characteristics may be obtained because impurities are not produced. Specifically, the temperature rising speed when calcining may be about 2° C./min to about 5° C./min.

The method for manufacturing cathode active material for a lithium secondary battery may further include forming a carbon-coated layer on the surface of the core-shell precursor after forming the core-shell precursor. Specifically, the carbon-coated layer may be formed by mixing a carbon source such as pitch carbon, sucrose, glucose, polyvinylalcohol, polypyrrole, cellulose, acetylene black, super-p with the core-shell complex followed by calcining thereof.

Further, when conducting the step of forming the core precursor, the step of forming the core-shell precursor or a combination thereof, carbon may be introduced to the core precursor, the core-shell precursor or a combination thereof by further mixing the said carbon source. At this time, the electric conductivity of the formed cathode active material for a lithium secondary battery may be improved.

The method for manufacturing the cathode active material for a lithium secondary battery may further include forming an intermediate layer precursor on the surface of the core precursor by mixing the core precursor with a M5 source, a M6 source and a phosphate source after forming the core precursor. The intermediate layer precursor may become an intermediate layer through the following calcining step. Unless otherwise stated, the M5 and the M6 may be the same as described above.

The intermediate layer precursor may be formed by mixing and reacting the M5 and the M6 sources including sulfur oxide, nitric oxide, acetic oxide, hydroxide, chloride, oxalate, fluoride and carbonate of the M5 and the M6, or a combination thereof, but not limited thereto.

The intermediate layer precursor may be formed in the form of phosphate, oxalate, carbonate, hydroxide or a combination thereof. Specifically, the intermediate layer precursor may be formed in the form of oxalate, carbonate or a combination thereof.

In the method for manufacturing cathode active material for a lithium secondary battery, general information in the art, for example, the use of complexing agent such as aqueous ammonia solution, the use of pH controlling agents such as an alkaline aqueous solution providing a hydroxyl group, heat treatment atmosphere and the like will be omitted.

According to the said process, the cathode active material for a lithium secondary battery according to one embodiment may be manufactured.

The cathode active material for a lithium secondary battery may be useful to the cathode of electrochemical cells such as lithium secondary battery. The lithium secondary battery may include the anode including an anode active material and an electrolyte.

The cathode may include a cathode current collector and a cathode active material layer formed on the cathode current collector.

The cathode active material layer also includes a binder and a conducting material.

The binder plays a role of attaching the cathode active material particles to each other, and well attaching the cathode active material to a current collector, and as a representative example of the binder, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoro ethylene, polyvinylidene fluoride, polyethylene, polypropylene, styrene-butadiene rubber, acrylated styrene-butadiene rubber, epoxy resin, nylon and the like may be used, but not limited thereto.

The conducting material is used for giving conductivity to the electrode, and any conducting material may be used if it does not cause chemical changes in the constituted cell and is a conductive material. For example, it may be natural graphite, artificial graphite, carbon black, acetylene black, Ketjen Black carbon fiber, metal powder such as copper, nickel, aluminum, silver, metal fiber and the like, and also conductive polymers such as polyphenylene derivatives may be used alone or in combination of at least one.

As the current collector of the cathode, Al can be used, but not limited thereto.

The anode includes an anode current collector and an anode active material layer formed on the anode current collector, and the anode active material layer includes an anode active material.

The anode active material may be a material, which can reversibly intercalate or deintercalate lithium ions, lithium metal, lithium metal alloy, materials, which can dope or dedope the lithium, or transition metal oxides.

The material, which can reversibly intercalate or deintercalate lithium ions, may be any carboneous material, which is any carbon-based anode active material generally used for a lithium ion secondary battery, and for example, it may be crystalline carbon, amorphous carbon or a combination thereof. The crystalline carbon may be amorphous, flake, lean flake, spherical or fiber type of natural graphite or artificial graphite, and the amorphous carbon may be soft carbon (carbon with low-temperature plasticity) or hard carbon, mesophase pitch carbide, calcined cokes and the like.

The lithium metal alloy may be an alloy of lithium and metal such as Na, K, Rb, Cs, Fr, Be, Mg, Ca, Sr, Si, Sb, Pb, In, Zn, Ba, Ra, Ge, Al or Sn.

The material, which can dope or dedope the lithium, may be Si, $SiO_x$ ($0<x<2$), Si-M alloy (the M is alkali metal, alkaline earth metal, group 13 to group 16 elements, transition metals, rare earths elements, or a combination thereof, but it is not Si), Sn, $SnO_2$, Sn-M (the M is alkali metal, alkaline earth metal, and group 13 to group 16 elements, transition metals, rare earth elements, or a combination thereof, but it is not Sn) and the like. Further, at least one of them and $SiO_2$ may be mixed. The elements M may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide and the like.

The anode active material layer may further include a binder, and it may further include a conducting material selectively.

The binder plays a role of attaching the anode active material particles to each other, and well attaching the anode active material to a current collector, and as a representative example of the binder, polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinyl pyrrolidone, polyurethane, polytetrafluoro ethylene, polyvinylidene fluoride, polyethylene, polypropylene, styrene-butadiene rubber, acrylated styrene-butadiene rubber, epoxy resin, nylon and the like may be used, but not limited thereto.

The conducting material is used for giving conductivity to the electrode, and any conducting material may be used if it does not cause chemical changes in the constituted cell and is a conductive material. For example, it may be natural graphite, artificial graphite, carbon black, acetylene black, Ketjen Black carbon fiber, metal powder such as copper, nickel, aluminum, silver, metal fiber and the like, and also conductive polymers such as polyphenylene derivatives or a combination thereof.

The anode current collector may be copper foil, nickel foil, stainless steel foil, titanium foil, nickel foam, copper foam, a polymer substrate coated with conductive metal, a combination thereof.

The cathode and the anode may be manufactured by: preparing an active material layer composition by mixing each active material, a conducting material and a binder in a solvent, followed by coating the composition on the current collector. This method for manufacturing the electrode is well known in the art. Accordingly, detailed description will be omitted in the specification. The solvent may be N-methylpyrrolidone and the like, but not limited thereto.

The electrolyte filled in the lithium secondary battery may be non-aqueous electrolyte or known solid electrolyte and the like, and an electrolyte, wherein lithium salt is dissolve, may be used.

Solvent for the non-aqueous electrolyte may be cyclic carbonate such as ethylene carbonate, diethylene carbonate, propylene carbonate and butylene carbonate, vinylene carbonate; chain carbonate such as dimethyl carbonate, ethyl methyl carbonate, diethyl carbonate; esters such as methyl acetate, ethyl acetate, propyl acetate, methyl propionate, ethyl propionate, γ-butyrolactone; ethers such as 1,2-dimethoxyethane, 1,2-diethoxyethane, tetrahydrofuran, 1,2-dioxane and 2-methyltetrahydrofuran; nitriles such as acetonitrile; and amides such as dimethylformamide, but is not limited thereto. These may be used alone or in combination of two or more. Particularly, a mixed solvent of the cyclic carbonate and the chain carbonate may be used.

Further, the electrolyte may be a gel polymer electrolyte impregnating polymer electrolyte such as polyethylene oxide, polyacrylonitrile and the like in an electrolyte solution, an inorganic solid electrolyte such as LiI, $Li_3N$, but not limited thereto.

At this time, the lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlO_7$, $LiAlCl_4$, LiCl and LiI, but not limited thereto.

According to types of the lithium secondary battery, a separator may be located between the cathode and the anode. The separator may be polyethylene, polypropylene, polyvinylidene fluoride, or a multilayer of more than two stories thereof, and a mixed multilayer such as a double-layered separator of polyethylene/polypropylene, a triple-layered separator of polyethylene/polypropylene/polyethylene, a triple-layered separator of polypropylene/polyethylene/polypropylene and the like may also be used.

According to types of the separator and the electrolyte, the lithium secondary battery may be classified into a lithium ion battery, a lithium ion polymer battery and a lithium polymer battery; according to the shape, it may be classified into cylindrical shape, square shape, coin shape, pouch shape and the like; and according to size, it may be classified into a bulk-type and a thin layer-type. The structures and methods for manufacturing thereof are well known in the art. Accordingly, detailed descriptions therefor are omitted.

A structure of the lithium secondary battery according to one embodiment is schematically illustrated in FIG. 1.

As shown in FIG. 1, the lithium secondary battery 100 includes: an anode 112; a cathode 114 located opposite to the anode 112; a separator 113 located between the anode 112 and the cathode 114; a battery case 120 including an electrolyte (not illustrated), in which the anode 112, the cathode 114 and the separator 113 are immersed; and a sealing member 140 sealing the case 120. The shape of the lithium secondary battery according to one embodiment is not particularly limited, and if it can operate as a battery, any battery of cylinder-shaped, coin-shaped, pouch-shaped and the like may be granted.

EXAMPLE

Hereinafter, Examples and Comparative Example will be described. The Examples are presented for illustrative purposes only, and do not limit the present invention.

Example 1: Manufacturing Cathode Active Material for Lithium Secondary Battery $MnSO_4 \cdot 5H_2O$, $H_3PO_4$ and $NH_4OH$ were put into a 4 L continuous stirred tank reactor (CSTR) (Volume: 4 L. Output of rotary motor of 90 W or more) at molar ratio of 3:2:6 and reacted at the condition of pH 7. At this time, $MnSO_4 \cdot 5H_2O$ was used at the molar concentration of 2.2 M. While keeping the internal temperature of the reactor at 55° C., the resulting mixture was stirred for 12 hours at 1,000 rpm to obtain a micro-sized spherical core precursor of $Mn_3(PO_4)_2 \cdot xH_2O$.

Then, after stop inserting the $MnSO_4 \cdot 5H_2O$, $FeSO_4 \cdot 7H_2O$ was added thereto to have the concentration of 2.2 M and stirred, and thereby a shell precursor of $Fe_3(PO_4)_2 \cdot xH_2O$ was formed on the surface of the core precursor, so as to obtain a core-shell precursor.

Then, the core-shell precursor was filtered by using a vacuum pump, and then dried for 24 hours at 70° C. under a vacuum atmosphere.

Then, the resulting compound was heat-treated for 15 hours under a reductive atmosphere at 550° C. to obtain a manganese phosphate-iron phosphate complex.

Then, based on 100 parts by weight of the manganese phosphate-iron phosphate complex, the pitch carbon was mixed to the manganese phosphate-iron phosphate complex in an amount of 2 parts by weight and stirred.

Then, the manganese phosphate-iron phosphate complex was mixed with a lithium phosphate ($Li_3PO_4$) at a molar ratio of 1:1, and heated to 700° C. at a heating speed of 5° C./min followed by calcining for 15 hours to obtain a olivine type cathode active material for a lithium secondary battery, which includes a carbon-coated layer and has a structure of $LiMnPO_4$ (core)-$LiFePO_4$ (shell).

Example 2: Manufacturing Cathode Active Material for Lithium Secondary Battery

Ethanol 2 L and $H_3PO_4$ 650 ml were added to a 4 L continuous stirred tank reactor (CSTR) (Volume: 4 L, Output of rotary motor of 90 W or more) and stirred.

$Mn(NO_3)_2 \cdot 4H_2O$ and $Fe(NO_3)_3 \cdot 9H_2O$ were mixed in another beaker at a molar ratio of 85:15, and dissolved in ethanol 1 L followed by putting into the 4 L continuous stirred tank reactor (CSTR). Then, while keeping the internal temperature of the 4 L continuous stirred tank reactor (CSTR) at 40° C., the resulting mixture was stirred for 5 hours at 1,000 rpm to obtain a micro-sized spherical core precursor of $Mn_{0.85}Fe_{0.15}PO_4 \cdot xH_2O$.

Then, the obtained core precursor was dispersed again in the 4 L continuous stirred tank reactor (CSTR). Then, $Fe(NO_3)_3 \cdot 9H_2O$ was added thereto to have the concentration of 1 M, $NH_4OH$ was added thereto, and the resulting mixture was stirred while keeping pH at 2. Thereby, a shell precursor of $FePO_4 \cdot xH_2O$ was formed on the surface of the core precursor to obtain a core-shell precursor.

Then, the core-shell precursor was filtered by using a vacuum pump, and dried for 24 hours at 70° C. under a vacuum atmosphere.

Then, the resulting compound was heat-treated for 1 hour at 500° C. under an air atmosphere to obtain a manganese iron phosphate-iron phosphate complex.

Then, based on 100 parts by weight of the manganese iron phosphate-iron phosphate complex, the pitch carbon was mixed to the manganese iron phosphate-iron phosphate complex in an amount of 2 parts by weight and stirred.

Then, the manganese iron phosphate-iron phosphate complex was mixed with a lithium carbonate ($Li_2CO_3$) at a molar ratio of 1:1, and heated to 700° C. at a heating speed of 5° C./min followed by calcining for 15 hours to obtain a olivine type cathode active material for a lithium secondary battery, which includes a carbon-coated layer and has a structure of $LiMn_{0.85}Fe_{0.15}PO_4$ (core)-$LiFePO_4$ (shell).

Example 3: Manufacturing Cathode Active Material for Lithium Secondary Battery $NiSO_4 \cdot 6H_2O$, $H_3PO_4$ and $NH_4OH$ were put into a 4 L continuous stirred tank reactor (CSTR) (Volume: 4 L, Output of rotary motor of 90 W or more) at molar ratio of 3:2:6 and reacted at the condition of pH 7. At this time, $NiSO_4 \cdot 6H_2O$ was used at the molar concentration of 2.2 M. While keeping the internal temperature of the reactor at 55° C., the resulting mixture was stirred for 12 hours at 1,000 rpm to obtain a micro-sized spherical core precursor of $Ni_3(PO_4)_2 \cdot xH_2O$.

Then, after stop inserting the $NiSO_4 \cdot 6H_2O$, $CoSO_4 \cdot 7H_2O$ was added thereto to have the concentration of 2.2 M and stirred, and thereby a shell precursor of $Co_3(PO_4)_2 \cdot xH_2O$ was formed on the surface of the core precursor, so as to obtain a core-shell precursor.

Then, the active material precursor was filtered by using a vacuum pump, and then dried for 24 hours at 70° C. under a vacuum atmosphere.

Then, the resulting compound was heat-treated for 10 hours under a reductive atmosphere at 550° C. to obtain a nickel phosphate-cobalt phosphate complex.

Then, based on 100 parts by weight of the nickel phosphate-cobalt phosphate complex, the pitch carbon was mixed to the nickel phosphate-cobalt phosphate complex in an amount of 5 parts by weight and stirred, so as to form a carbon-coated layer on the surface of the nickel phosphate-cobalt phosphate complex.

Then, the nickel phosphate-cobalt phosphate complex with the carbon-coated layer was mixed with a lithium phosphate ($Li_3PO_4$) at a molar ratio of 1:1, and heated to 750° C. at a heating speed of 5° C./min followed by calcining for 10 hours to obtain a olivine type cathode active material for a lithium secondary battery, which includes a carbon-coated layer and has a structure of $LiNiPO_4$ (core)-$LiCoPO_4$ (shell).

Example 4: Manufacturing Lithium Secondary Battery

The cathode active material for a lithium secondary battery manufactured in Example 1, as a conducting material, super-P, as a binder, polyvinylidene fluoride (PVDF)

were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1.2 M in a mixed solvent of ethylene carbonate and ethyl methyl carbonate (volume ratio of 3:7).

Example 5: Manufacturing Lithium Secondary Battery

The cathode active material for a lithium secondary battery manufactured in Example 2, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1 M in a mixed solvent of ethylene carbonate and ethyl methyl carbonate (volume ratio of 3:7).

Example 6: Manufacturing Lithium Secondary Battery

The cathode active material for a lithium secondary battery manufactured in Example 3, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1.2 M in a mixed solvent of ethylene carbonate and ethyl methyl carbonate (volume ratio of 3:7)

Comparative Example 1: Manufacturing Cathode Active Material for Lithium Secondary Battery $FeSO_4 \cdot 7H_2O$, $H_3PO_4$ and $NH_4OH$ were put into a 4 L continuous stirred tank reactor (CSTR) (Volume: 4 L, Output of rotary motor of 90 W or more) at molar ratio of 3:2:6 and reacted at the condition of pH 7. At this time, $FeSO_4 \cdot 7H_2O$ was used at the molar concentration of 2.2 M. While keeping the internal temperature of the reactor at 55° C., the resulting mixture was stirred for 12 hours at 1,000 rpm to obtain a micro-sized spherical active material precursor of $Fe_3(PO_4)_2 \cdot xH_2O$.

Then, the active material precursor was filtered by using a vacuum pump, and then dried for 24 hours at 70° C. under a vacuum atmosphere.

Then, the resulting compound was heat-treated for 15 hours under a reductive atmosphere at 550° C. to obtain an iron phosphate complex.

Then, based on 100 parts by weight of the iron phosphate complex, the pitch carbon was mixed to the iron phosphate complex in an amount of 2 parts by weight and stirred.

Then, the iron phosphate complex was mixed with a lithium phosphate ($Li_3PO_4$) at a molar ratio of 1:1, and heated to 750° C. at a heating speed of 5° C./min followed by calcining for 15 hours to obtain a olivine type cathode active material for a lithium secondary battery, which includes a carbon-coated layer and has a structure of $LiFePO_4$.

Comparative Example 2: Manufacturing Cathode Active Material for Lithium Secondary Battery $MnSO_4 \cdot 5H_2O$, $H_3PO_4$ and $NH_4OH$ were put into a 4 L continuous stirred tank reactor (CSTR) (Volume: 4 L, Output of rotary motor of 90 W or more) at molar ratio of 3:2:6 and reacted at the condition of pH 7. At this time, $MnSO_4 \cdot 5H_2O$ was used at the molar concentration of 2.2 M. While keeping the internal temperature of the reactor at 55° C., the resulting mixture was stirred for 12 hours at 1,000 rpm to obtain a micro-sized spherical active material precursor of $Mn_3(PO_4)_2 \cdot xH_2O$.

Then, the active material precursor was filtered by using a vacuum pump, and then dried for 24 hours at 70° C. under a vacuum atmosphere.

Then, the resulting compound was heat-treated for 15 hours under a reductive atmosphere at 550° C. to obtain a manganese phosphate complex.

Then, based on 100 parts by weight of the manganese phosphate complex, the pitch carbon was mixed to the manganese phosphate complex in an amount of 2 parts by weight and stirred.

Then, the manganese phosphate complex was mixed with a lithium phosphate ($Li_3PO_4$) at a molar ratio of 1:1, and heated to 750° C. at a heating speed of 5° C./min followed by calcining for 15 hours to obtain a olivine type cathode active material for a lithium secondary battery, which includes a carbon-coated layer and has a structure of $LiMnPO_4$.

Comparative Example 3: Manufacturing Cathode Active Material for Lithium Secondary Battery Ethanol 2 L and $H_3PO_4$ 650 ml were added to a 4 L continuous stirred tank reactor (CSTR) (Volume: 4 L, Output of rotary motor of 90 W or more) and stirred.

$Mn(NO_3)_2 \cdot 4H_2O$ and $Fe(NO_3)_3 \cdot 9H_2O$ were mixed in another beaker at a molar ratio of 85:15, and dissolved in ethanol 1 L followed by putting into the 4 L continuous stirred tank reactor (CSTR). Then, while keeping the internal temperature of the 4 L continuous stirred tank reactor (CSTR) at 40° C., the resulting mixture was stirred for 5 hours at 1,000 rpm to obtain a micro-sized spherical active material precursor of $Mn_{0.85}Fe_{0.15}PO_4 \cdot xH_2O$.

Then, the active material precursor was filtered by using a vacuum pump, and dried for 24 hours at 70° C. under a vacuum atmosphere.

Then, the resulting compound was heat-treated for 1 hour at 500° C. under an air atmosphere to obtain a manganese iron phosphate.

Then, based on 100 parts by weight of the manganese iron phosphate, the pitch carbon was mixed to the manganese iron phosphate in an amount of 2 parts by weight and stirred.

Then, the manganese iron phosphate was mixed with a lithium carbonate ($Li_2CO_3$) at a molar ratio of 1:1, and heated to 700° C. at a heating speed of 5° C./min followed by calcining for 15 hours to obtain a olivine type cathode active material for a lithium secondary battery, which includes a carbon-coated layer and has a structure of $LiMn_{0.85}Fe_{0.15}PO_4$.

Comparative Example 4: Manufacturing Cathode Active Material for Lithium Secondary Battery $NiSO_4 \cdot 6H_2O$, $H_3PO_4$ and $NH_4OH$ were put into a 4 L continuous stirred tank reactor (CSTR) (Volume: 4 L, Output of rotary motor of 90 W or more) at molar ratio of 3:2:6 and reacted at the condition of pH 7. At this time, $NiSO_4 \cdot 6H_2O$ was used at the molar concentration of 2.2 M. While keeping the internal temperature of the reactor at 55° C., the resulting mixture was stirred for 12 hours at 1,000 rpm to obtain a micro-sized spherical active material precursor of $Ni_3(PO_4)_2 \cdot xH_2O$.

Then, the active material precursor was filtered by using a vacuum pump, and then dried for 24 hours at 70° C. under a vacuum atmosphere.

Then, the resulting compound was heat-treated for 15 hours under a reductive atmosphere at 550° C. to obtain a nickel phosphate.

Then, based on 100 parts by weight of the nickel phosphate, the pitch carbon was mixed to the nickel phosphate in an amount of 2 parts by weight and stirred, so as to form a carbon-coated layer on the surface of the nickel phosphate.

Then, the nickel phosphate with the carbon-coated layer was mixed with a lithium phosphate ($Li_3PO_4$) at a molar ratio of 1:1, and heated to 750° C. at a heating speed of 5° C./min followed by calcining for 10 hours to obtain a olivine type cathode active material for a lithium secondary battery, which includes a carbon-coated layer and has a structure of $LiNiPO_4$.

Comparative Example 5: Manufacturing Cathode Active Material for Lithium Secondary Battery $CoSO_4 \cdot 7H_2O$, $H_3PO_4$ and $NH_4OH$ were put into a 4 L continuous stirred tank reactor (CSTR) (Volume: 4 L, Output of rotary motor of 90 W or more) at molar ratio of 3:2:6 and reacted at the condition of pH 7. At this time, $CoSO_4 \cdot 7H_2O$ was used at the molar concentration of 2.2 M. While keeping the internal temperature of the reactor at 55° C., the resulting mixture was stirred for 12 hours at 1,000 rpm to obtain a micro-sized spherical active material precursor of $Co_3(PO_4)_2 \cdot xH_2O$.

Then, the active material precursor was filtered by using a vacuum pump, and then dried for 24 hours at 70° C. under a vacuum atmosphere.

Then, the resulting compound was heat-treated for 15 hours under a reductive atmosphere at 550° C. to obtain a cobalt phosphate.

Then, based on 100 parts by weight of the cobalt phosphate, the pitch carbon was mixed to the cobalt phosphate in an amount of 2 parts by weight and stirred, so as to form a carbon-coated layer on the surface of the cobalt phosphate.

Then, the cobalt phosphate with the carbon-coated layer was mixed with a lithium phosphate ($Li_3PO_4$) at a molar ratio of 1:1, and heated to 750° C. at a heating speed of 5° C./min followed by calcining for 15 hours to obtain a olivine type cathode active material for a lithium secondary battery, which includes a carbon-coated layer and has a structure of $LiCoPO_4$.

Comparative Example 6: Manufacturing Lithium Secondary Battery

The cathode active material for a lithium secondary battery manufactured in Comparative Example 1, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1.2 M in a mixed solvent of ethylene carbonate and ethyl methyl carbonate (volume ratio of 3:7).

Comparative Example 7: Manufacturing Lithium Secondary Battery

The cathode active material for a lithium secondary battery manufactured in Comparative Example 2, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1.2 M in a mixed solvent of ethylene carbonate and ethyl methyl carbonate (volume ratio of 3:7).

Comparative Example 8: Manufacturing Lithium Secondary Battery

The cathode active material for a lithium secondary battery manufactured in Comparative Example 3, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein $LiPF_6$ was dissolved in a concentration of 1 M in a mixed solvent of ethylene carbonate and ethyl methyl carbonate (volume ratio of 3:7).

Comparative Example 9: Manufacturing Lithium Secondary Battery

The cathode active material for a lithium secondary battery manufactured in Comparative Example 4, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein LiPF$_6$ was dissolved in a concentration of 1.2 M in a mixed solvent of ethylene carbonate and ethyl methyl carbonate (volume ratio of 3:7).

Comparative Example 10: Manufacturing Lithium Secondary Battery

The cathode active material for a lithium secondary battery manufactured in Comparative Example 5, as a conducting material, super-P, as a binder, polyvinylidene fluoride (PVDF) were mixed at the weight ratio of 85:7.5:7.5 to obtain a cathode active material layer composition. The cathode active material layer composition was uniformly coated on a 20 μm-thick aluminum foil, and vacuum dried at 120° C. to obtain a cathode.

A coin half cell was manufactured according to a commonly known method by using: the manufactured cathode and a lithium foil as the counter electrode, a porous polyethylene membrane (Celgard 2300, thickness: 25 μm, Celgard LLC) as the separator, and a liquid electrolyte wherein LiPF$_6$ was dissolved in a concentration of 1.2 M in a mixed solvent of ethylene carbonate and ethyl methyl carbonate (volume ratio of 3:7).

Test Example 1: Measuring Tap Density

For each of the cathode active material for a lithium secondary battery manufactured in Examples 1 to 3 and Comparative Examples 1 to 5, 500 times of strokes was performed using 10 ml mass cylinder to measure a tap density.

Comparison of Example 1, Example 2 and Comparative Examples 1 to 3

The cathode active material for a lithium secondary battery manufactured in Example 1 has the tap density of 1.5 g/cm$^3$, the cathode active material for a lithium secondary battery manufactured in Example 2 has the tap density of 1.5 g/cm$^3$, the cathode active material for a lithium secondary battery manufactured in Comparative Example 1 has the tap density of 1.4 g/cm$^3$, the cathode active material for a lithium secondary battery manufactured in Comparative Example 2 has the tap density of 1.2 g/cm$^3$, and the cathode active material for a lithium secondary battery manufactured in Comparative Example 3 has the tap density of 1.2 g/cm$^3$.

Accordingly, it can be confirmed that the tap densities of the cathode active materials for a lithium secondary battery of Example 1 and Example 2 are higher than the tap densities of the cathode active materials for a lithium secondary battery of Comparative Examples 1 to 3.

Comparison of Example 3, Comparative Example 4 and Comparative Example 5

The cathode active material for a lithium secondary battery manufactured in Example 3 has the tap density of 1.5 g/cm$^3$, the cathode active material for a lithium secondary battery manufactured in Comparative Example 4 has the tap density of 1.4 g/cm$^3$, and the cathode active material for a lithium secondary battery manufactured in Comparative Example 5 has the tap density of 1.2 g/cm$^3$.

Accordingly, it can be confirmed that the tap density of the cathode active material for a lithium secondary battery of Example 3 is higher than the tap densities of the cathode active materials for a lithium secondary battery of Comparative Examples 4 and 5.

Test Example 2: Scanning Electron Microscope (SEM) Imaging and Energy Dispersive X-Ray (EDX) Analysis After Each of the core-shell precursors and the cathode active materials for a lithium secondary battery manufactured in Examples 1 to 3, and each of the active material precursors manufactured in Comparative Examples 1 to 5 was sampled on a carbon tape followed by coated with platinum (Pt) plasma, SEM pictures were taken, and energy dispersive X-ray analysis was conducted.

At this time, scanning electron microscope (SEM) JSM 6400 (JEOL) was used.

Comparison of Example 1, Example 2 and Comparative Example 2

Figure 2:
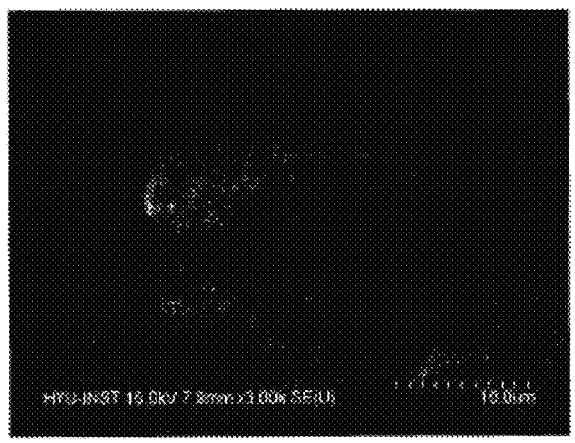
FIG. 2: a scanning electron microscope (SEM) image enlarging a part of the core-shell precursor manufactured in Example 13,000 times.
Figure 3:
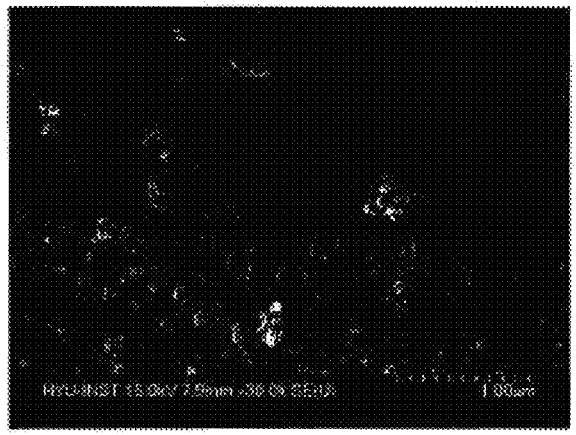
FIG. 3: a scanning electron microscope (SEM) image enlarging a part of the core-shell precursor manufactured in Example 130,000 times.

A scanning electron microscope (SEM) image enlarging a part of the core-shell precursor manufactured in Example 13,000 times is illustrated in FIG. 2, and a scanning electron microscope (SEM) image enlarging thereof 30,000 is illustrated in FIG. 3.

Figure 4:
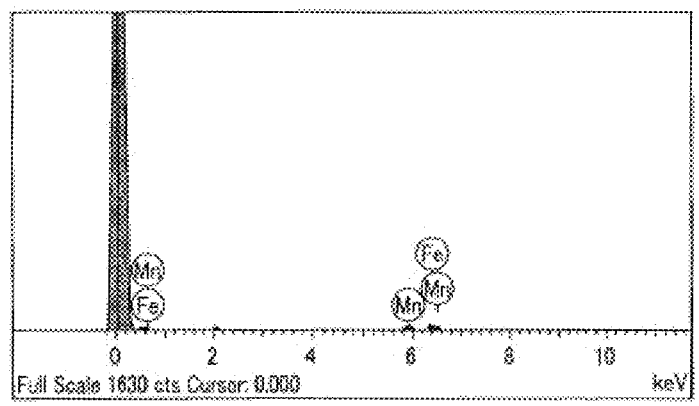
FIG. 4: data from energy dispersive X-ray (EDX) analysis of the core-shell precursor manufactured in Example 1.

Further, data from energy dispersive X-ray (EDX) analysis of the core-shell precursor manufactured in Example 1 is illustrated in FIG. 4.

As shown in FIG. 2 and FIG. 3, it can be confirmed that the core-shell precursor manufactured in Example 1 is formed as a core-shell structure wherein the surface of the core is surrounded by spherical particles.

Further, as shown in FIG. 4, it could be confirmed that the core-shell precursor manufactured in Example 1 include both of Mn and Fe.

Accordingly, referring to FIG. 2 to FIG. 4, it can be predicted that the cathode active material for a lithium secondary battery, which is manufactured by heat-treating and calcining the core-shell precursor manufactured in Example 1, may have a structure of LiMnPO$_4$ (core)-LiFePO$_4$ (shell).

Figure 5:
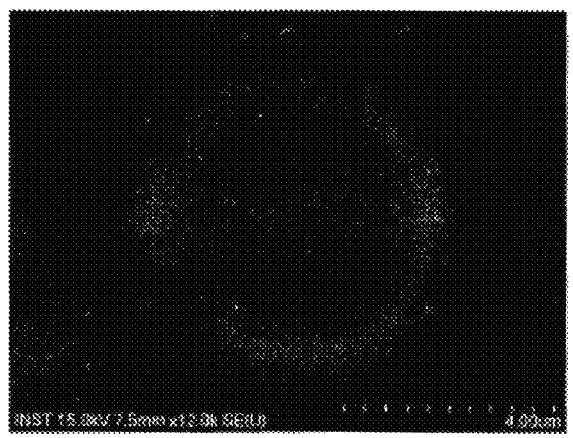
FIG. 5: a scanning electron microscope (SEM) image enlarging a part of the core-shell precursor part manufactured in Example 212,000 times.
Figure 6:
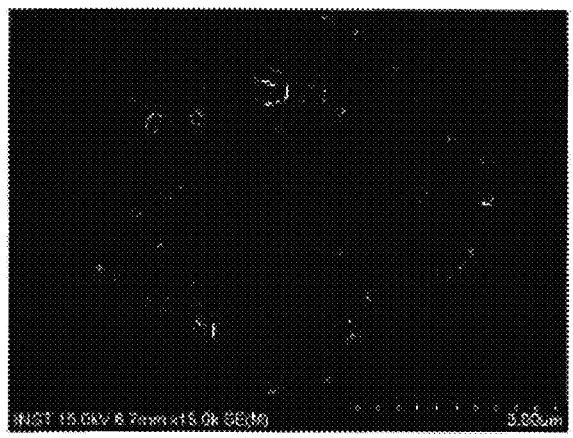
FIG. 6: a scanning electron microscope (SEM) image enlarging a part of the cathode active material for a lithium secondary battery manufactured in Example 215,000 times.

A scanning electron microscope (SEM) image enlarging a part of the core-shell precursor part manufactured in Example 212,000 times is illustrated in FIG. 5, and a scanning electron microscope (SEM) image enlarging a part of the cathode active material for a lithium secondary battery manufactured in Example 215,000 times is illustrated in FIG. 6.

As shown in FIG. 5 and FIG. 6, it can be confirmed that the core-shell precursor and the cathode active material for a lithium secondary battery manufactured in Example 2 may be formed in a core-shell structure. Accordingly, it can be predicted that the cathode active material for a lithium secondary battery manufactured in Example 2 may have a structure of LiMn$_{0.85}$Fe$_{0.15}$PO$_4$ (core)-LiFePO$_4$ (shell).

Figure 7:
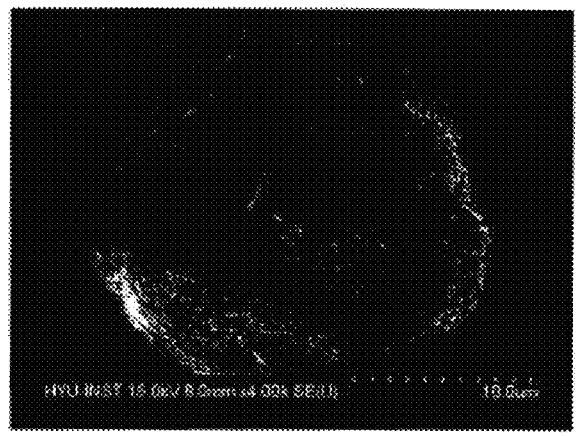
FIG. 7: a scanning electron microscope (SEM) image enlarging a part of the active material precursor part manufactured in Comparative Example 2 4,000 times.
Figure 8:
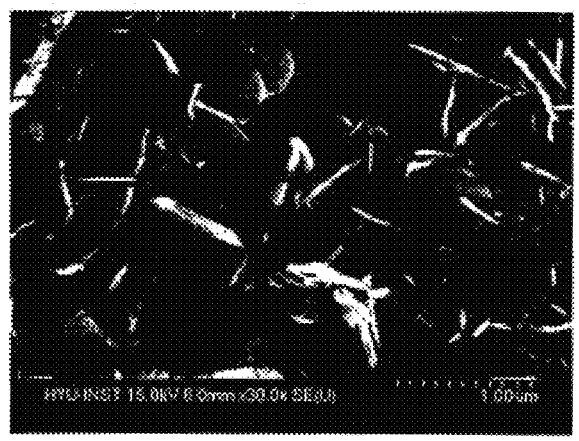
FIG. 8: a scanning electron microscope (SEM) image enlarging a part of the active material precursor part manufactured in Comparative Example 2 30,000 times.

On the other hand, a scanning electron microscope (SEM) image enlarging a part of the active material precursor part manufactured in Comparative Example 24,000 times is illustrated in FIG. 7, and a scanning electron microscope (SEM) image enlarging thereof 30,000 times is illustrated in FIG. 8.

Figure 9:
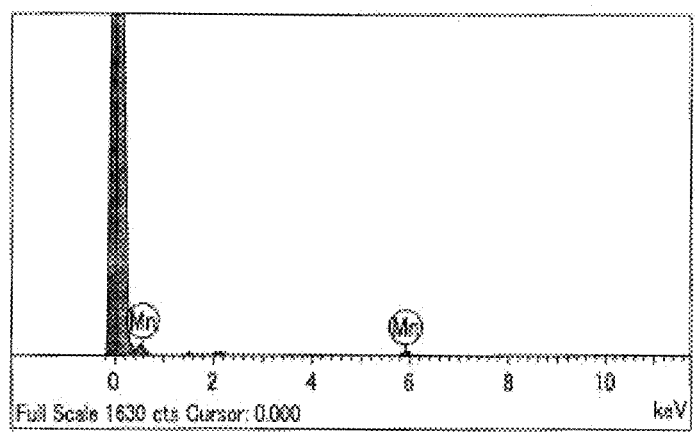
FIG. 9: data from energy dispersive X-ray (EDX) analysis of the active material precursor manufactured in Comparative Example 2.

Further, data from energy dispersive X-ray (EDX) analysis of the active material precursor manufactured in Comparative Example 2 is illustrated in FIG. 9.

As shown in FIG. 7 and FIG. 8, it can be confirmed that the active material precursor manufactured in Comparative Example 2 is formed in the form of the micron-sized secondary particle formed by conglomerated flake type primary particles.

Further, as shown in FIG. 9, it can be confirmed that the active material precursor manufactured in Comparative Example 2 includes Mn.

Thus, referring to FIG. 7 to FIG. 9, it can be predicted that the active material precursor manufactured in Comparative Example 2 may has a particle structure of $LiMnPO_4$.

Comparison of Example 3 and Comparative Example 4

Figure 10:
FIG. 10: a scanning electron microscope (SEM) image of the cross-section of the core-shell precursor manufactured in Example 3.

A scanning electron microscope (SEM) image of the cross-section of the core-shell precursor manufactured in Example 3 is illustrated in FIG. 10.

Figure 11:
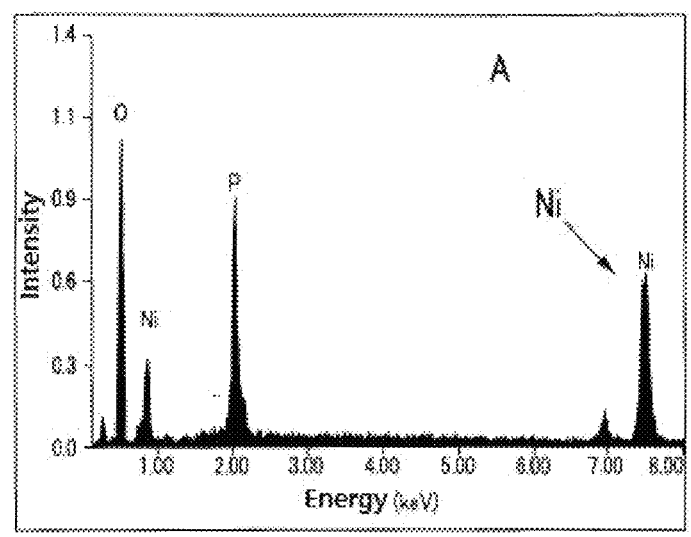
FIG. 11: data from energy dispersive X-ray (EDX) analysis of the point A of FIG. 10.
Figure 12:
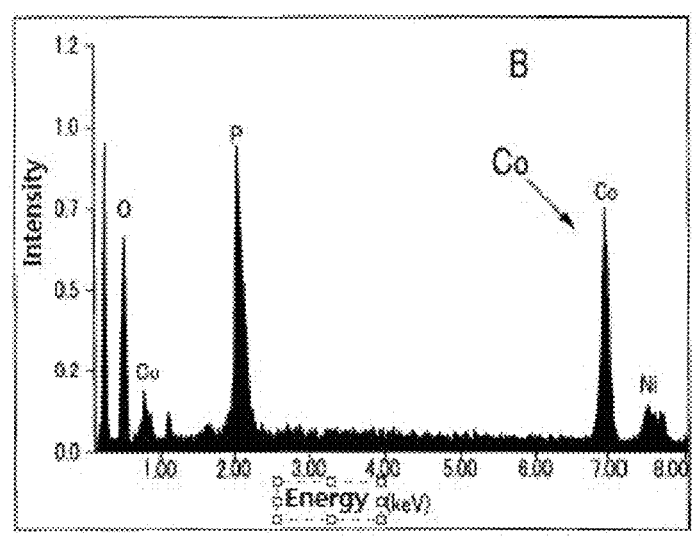
FIG. 12 is data from energy dispersive X-ray (EDX) analysis of the point B of FIG. 10.

Further, data from energy dispersive X-ray (EDX) analysis of the point A and B of FIG. 10 are illustrated in FIG. 11 and FIG. 12, respectively.

As shown in FIG. 10, FIG. 11 and FIG. 12, it can be confirmed that the core-shell precursor manufactured in Example 3 is formed as a core-shell structure, which includes a core including Ni and a shell including Co.

Accordingly, referring to FIG. 10, FIG. 11 and FIG. 12, it can be predicted that the cathode active material for a lithium secondary battery, which is manufactured by heat-treating and calcining the core-shell precursor manufactured in Example 3 has a $LiNiPO_4$ (core)-$LiCoPO_4$ (shell) structure.

Figure 13:
FIG. 13: a scanning electron microscope (SEM) image of the cross-section of the core-shell precursor manufactured in Comparative Example 4.

On the other hand, a scanning electron microscope (SEM) image of the cross-section of the active material precursor manufactured in Comparative Example 4 is illustrated in FIG. 13.

Figure 14:
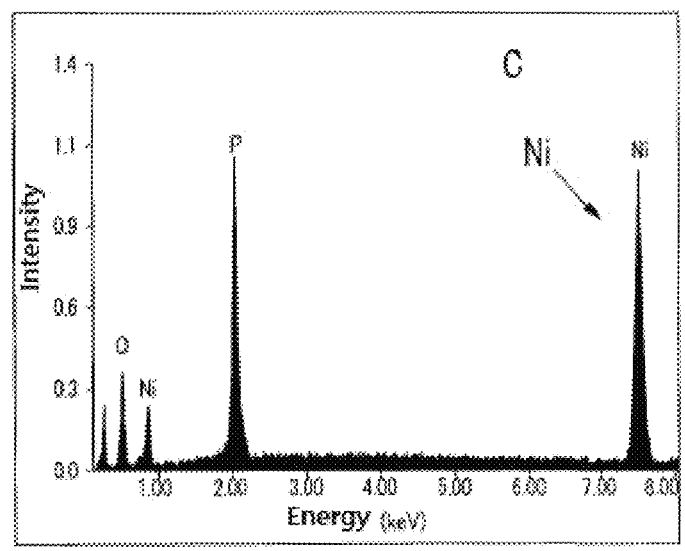
FIG. 14: data from energy dispersive X-ray (EDX) analysis of the point C of FIG. 13.
Figure 15:
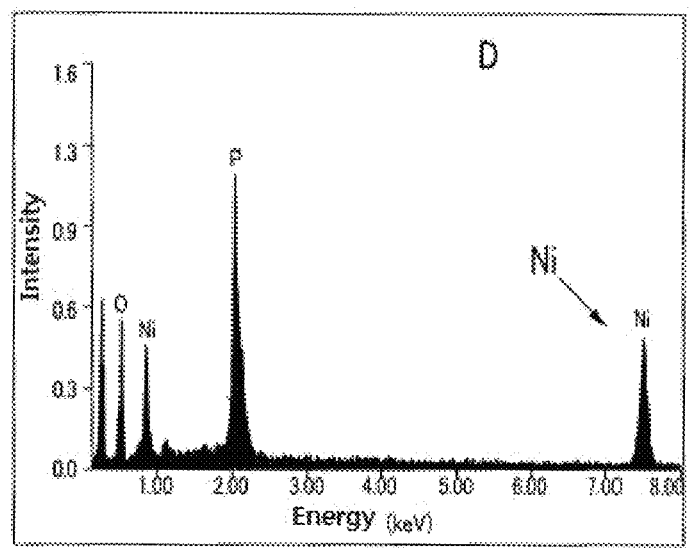
FIG. 15 is data from energy dispersive X-ray (EDX) analysis of the point D of FIG. 13.

Further, data from energy dispersive X-ray (EDX) analysis of the point C and D of FIG. 13 are illustrated in FIG. 14 and FIG. 15, respectively.

As shown in FIG. 13, FIG. 14 and FIG. 15, it can be confirmed that the active material precursor manufactured in Comparative Example 4 is formed as a single particle structure including Ni. Accordingly, referring to FIG. 13, FIG. 14 and FIG. 15, it can be predicted that the active material manufactured in Comparative Example 4 has a $LiNiPO_4$ particle structure.

Test Example 3: Measuring Initial Charging Capacity, Initial Discharging Capacity and Coulomb Efficiency Comparison of Example 4, Comparative Example 6 and Comparative Example 7

The coin half cells manufactured in Example 4, Comparative Example 6 and Comparative Example 7 were charged/discharged one time at 30° C., 2.7 V to 4.5 V, 0.05C-rate, respectively, and then the initial charging capacity, the initial discharging capacity and the coulomb efficiency were measured.

Figure 16:
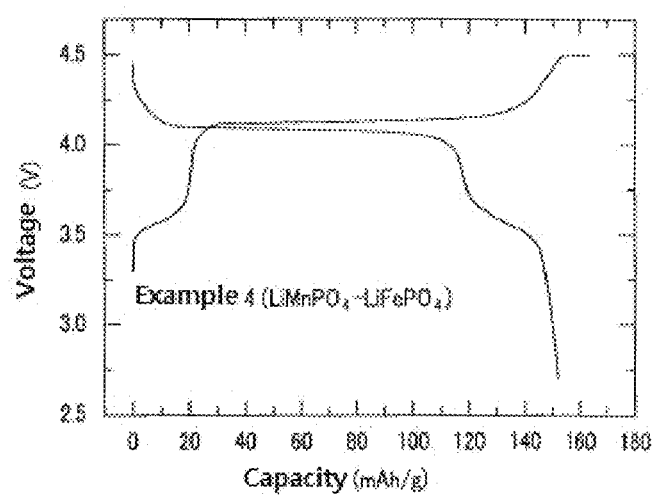
FIG. 16: a charging/discharging graph of the first cycle of the coin half cell manufactured in Example 4.

A charging/discharging graph of the first cycle of the coin half cell manufactured in Example 4 is illustrated in FIG. 16.

As shown in FIG. 16, the coin half cell manufactured in Example 4 showed the initial charging capacity of 153 mAh/g and the initial discharging capacity of 152 mAh/g, thereby the coulomb efficiency of about 99.3%.

Figure 17:
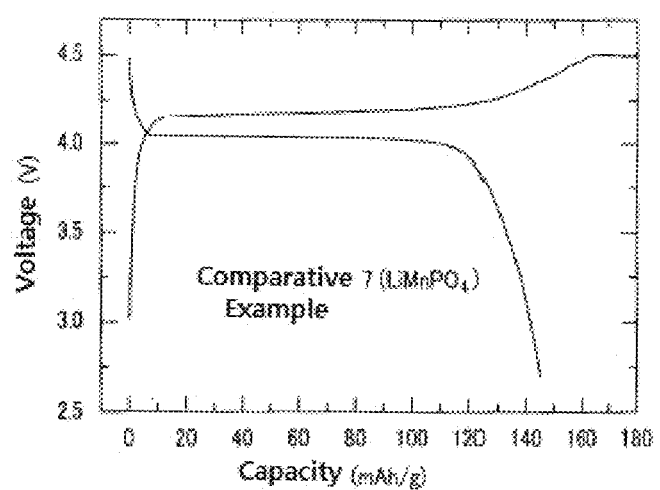
FIG. 17: a charging/discharging graph of the first cycle of the coin half cell manufactured in Comparative Example 7.

A charging/discharging graph of the first cycle of the coin half cell manufactured in Comparative Example 7 is illustrated in FIG. 17.

As shown in FIG. 17, the coin half cell manufactured in Comparative Example 7 showed the initial charging capacity of 162 mAh/g and the initial discharging capacity of 145 mAh/g, thereby the coulomb efficiency of about 89.5%.

Accordingly, it can be confirmed that the coin half cell manufactured in Example 4 shows lower initial charging capacity than the coin half cell manufactured in Comparative Example 7, but showed better initial discharging capacity and coulomb efficiency than the coin half cell manufactured in Comparative Example 7.

Comparison of Example 5 and Comparative Example 8

The coin half cells manufactured in Example 5 and Comparative Example 8 were charged/discharged one time at 30° C., 2.7 V to 4.5 V, 20C-rate, respectively, and then the initial charging capacity, the initial discharging capacity and the coulomb efficiency were measured.

Figure 18:
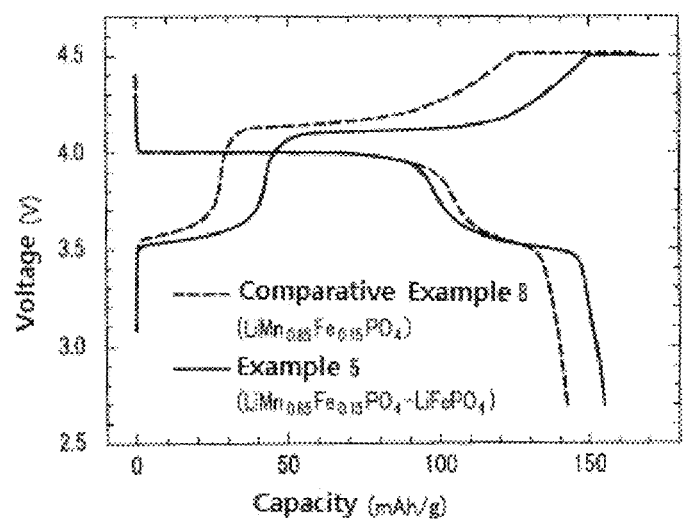
FIG. 18: a charging/discharging graph of the first cycle of the coin half cells manufactured in Example 5 and Comparative Example 8.

A charging/discharging graph of the first cycle of the coin half cells manufactured in Example 5 and Comparative Example 8 is illustrated in FIG. 18.

As shown in FIG. 18, the coin half cell manufactured in Example 5 showed the initial charging capacity of 170 mAh/g and the initial discharging capacity of 154 mAh/g, thereby the coulomb efficiency of about 90.6%, and the coin half cell manufactured in Comparative Example 8 showed the initial charging capacity of 162 mAh/g and the initial discharging capacity of 142 mAh/g, thereby the coulomb efficiency of about 87.7%.

Accordingly, it can be confirmed that the coin half cell manufactured in Example 5 has better initial charging capacity, initial discharging capacity and coulomb efficiency than the coin half cell manufactured in Comparative Example 8.

Comparison of Example 6, Comparative Example 9 and Comparative Example 10

The coin half cells manufactured in Example 6, Comparative Example 9 and Comparative Example 10 were charged/discharged one time at 30° C., 3.0 V to 5.3V, 0.05C-rate (7.5 mA/g), respectively, and then the initial charging capacity, the initial discharging capacity and the coulomb efficiency were measured.

Figure 19:
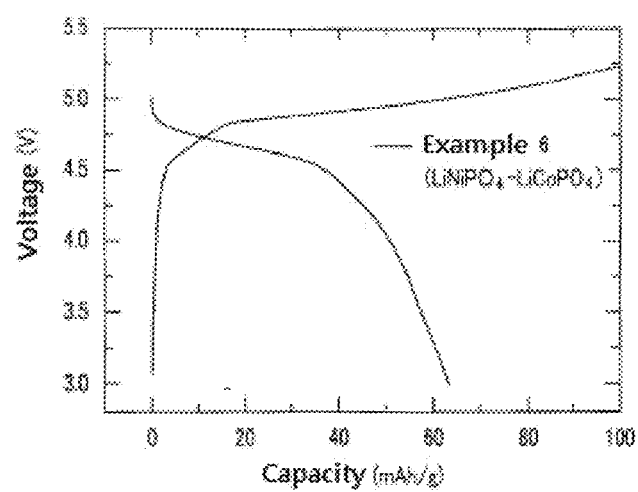
FIG. 19: a charging/discharging graph of the first cycle of the coin half cell manufactured in Example 6.

A charging/discharging graph of the first cycle of the coin half cell manufactured in Example 6 is illustrated in FIG. 19. The coin half cell manufactured in Example 6 showed the initial charging capacity of 109.6 mAh/g and the initial discharging capacity of 63.2 mAh/g, thereby the coulomb efficiency of about 58%.

Figure 20:
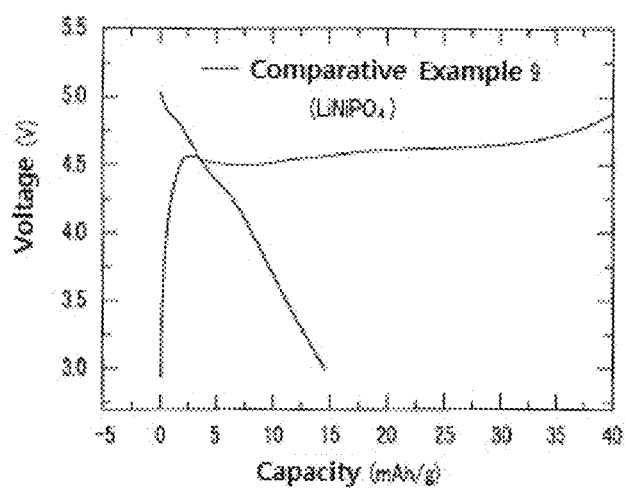
FIG. 20: a charging/discharging graph of the first cycle of the coin half cell manufactured in Comparative Example 9.

A charging/discharging graph of the first cycle of the coin half cell manufactured in Comparative Example 9 is illustrated in FIG. 20. The coin half cell manufactured in Example 9 showed the initial charging capacity of 99.5 in Ah/g and the initial discharging capacity of 14.4 mAh/g, thereby the coulomb efficiency of about 14%.

Accordingly, it can be confirmed that the coin half cell manufactured in Example 6 has better initial charging capacity, initial discharging capacity and coulomb efficiency than the coin half cell manufactured in Comparative Example 9.

Test Example 4: Cycle Life Characteristic

Comparison of Example 4, Comparative Example 6 and Comparative Example 7

The coin half cells manufactured in Example 4, Comparative Example 6 and Comparative Example 7 were charged/discharged with 50 cycles at 2.7 V to 4.5 V, 0.05C-rate, and the change in discharging capacity was measured. Of them, the results of Example 4 and Comparative Example 7 were shown in FIG. 21.

Figure 21:
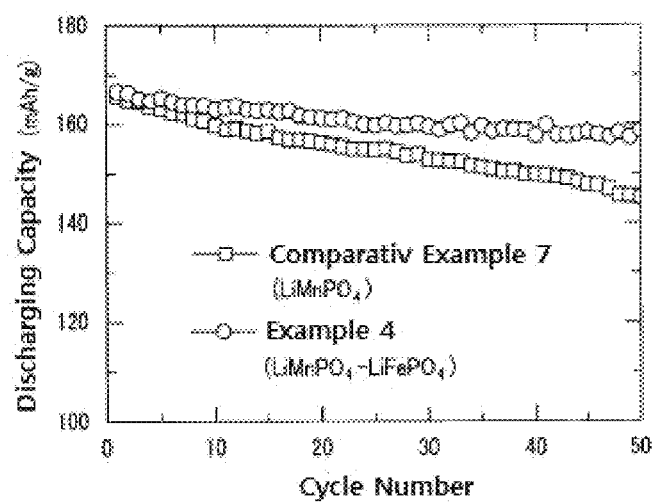
FIG. 21: a graph showing the change in discharging capacity when charging/discharging the coin half cells manufactured in Example 4 and Comparative Example 750 cycles.

As shown in FIG. 21, after charging/discharging of 50 cycles, the coin half cell of Example 4 showed about 97% capacity retention rate, and the coin half cell of Comparative Example 7 showed about 89% capacity retention rate.

Accordingly, it can be confirmed that the coin half cell manufactured in Example 4 achieves higher capacity than the coin half cell manufactured in Comparative Example 7, and has better life characteristic than the coin half cell manufactured in Comparative Example 7.

Comparison of Example 5 and Comparative Example 8

The coin half cells manufactured in Example 5 and Comparative Example 8 were charged/discharged with 50 cycles at 2.7 V to 4.5 V, 0.2C-rate, about 55° C., and the change in discharging capacity was measured. The results of Example 5 and Comparative Example 8 were shown in FIG. 22.

Figure 22:
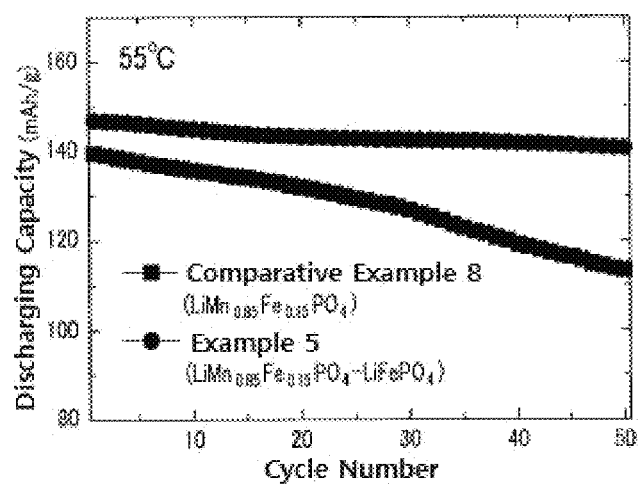
FIG. 22: a graph showing the change in discharging capacity when charging/discharging the coin half cells manufactured in Example 5 and Comparative Example 850 cycles.

As shown in FIG. 22, after charging/discharging of 50 cycles, the coin half cell of Example 5 showed about 95.6% capacity retention rate, and the coin half cell of Comparative Example 8 showed about 81.2% capacity retention rate.

Accordingly, it can be confirmed that the coin half cell manufactured in Example 5n half cell achieves higher capacity than the coin half cell manufactured in Comparative Example 8, and has better life characteristic than the coin half cell manufactured in Comparative Example 8.

Test Example 5: Evaluation of Thermal Stability

The coin half cells manufactured in Examples 4 to 6 and Comparative Examples 6 to 10 were charged to 4.5 V at 25° C., 0.5C-rate, and then disassembled in a glove box filled with Ar.

Materials of the disassembled cathode plate were subjected to differential scanning calorimetry (DSC) analysis by using Shimadzu DSC-60 (Shimadzu) apparatus.

Comparison of Example 4, Comparative Example 6 and Comparative Example 7

Figure 23:
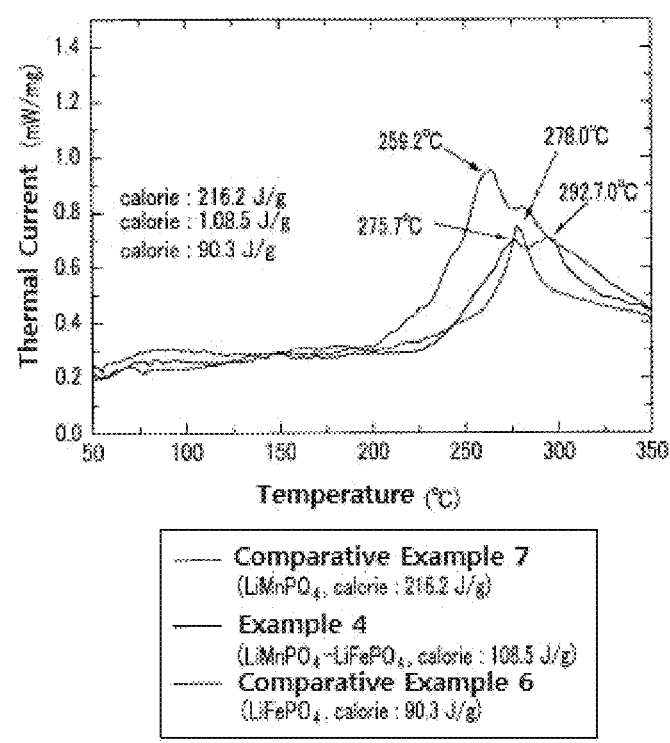
FIG. 23: a DSC graph of a coin half cell of Example 4, Comparative Example 6 and Comparative Example 7.

The results of differential scanning calorimetry (DSC) of Example 4, Comparative Example 6 and Comparative Example 7 are shown in FIG. 23.

As shown in FIG. 23, it can be confirmed that the calorific value of Example 4 is less than the calorific value of Comparative Example 7, and is similar with the calorific value of Comparative Example 6. Further, the onset temperature of Example 4 is higher than the onset temperature of Comparative Example 7, and is similar with the onset temperature of Comparative Example 6.

Accordingly, it can be confirmed that the coin half cell manufactured in Example 4 has excellent thermal stability.

While the invention has been described with respect to the above specific embodiments, it should be recognized that various modifications and changes may be made and also fall within the scope of the invention as defined by the claims that follow.

What is claimed is:

1. A cathode active material for a lithium secondary battery comprising:
   a core including a compound represented by the following Chemical Formula 1; and
   a shell including a compound represented by the following Chemical Formula 2,
   wherein the material composition of the core and the material composition of the shell are different:

$Li_{x1}M1_{y1}M2_{z1}PO_{4-w1}E_{w1}$     [Chemical Formula 1]

$Li_{x2}M3_{y2}M4_{z2}PO_{4-w2}E_{w2}$     [Chemical Formula 2]

wherein M1, M2, and M3 are independently selected from the group consisting of Ni, Co, Mn, Fe, Na, Mg, Ca, Ti, V, Cr, Cu, Zn, Ge, Sr, Ag, Ba, Zr, Nb, Mo, Al, Ga, B and a combination thereof, and M1 and M3 are identical, M1 and M2 are different from each other;
   E is selected from the group consisting of F, S and a combination thereof;

$0<x1\leq1.1, 0<y1\leq1, 0<z1\leq1, 0<x1+y1+z1\leq2;$ $0\leq w1\leq0.5;$ $0<x2\leq1.1, 0<y2\leq1, z2=0, 0<x2+y2+z2\leq2; 0\leq w2\leq0.5;$ $y1<y2$.

2. The cathode active material for a lithium secondary battery according to claim 1, wherein x1=x2.

3. The cathode active material for a lithium secondary battery according to claim 1, wherein the M1 and the M3 are selected from the group consisting of Fe, Co, Ni, Mn and a combination thereof, and the M2 is selected from the group consisting of Mn, Ni, Co, Fe and a combination thereof.

4. The cathode active material for a lithium secondary battery according to claim 1, wherein
   the core has a structure in which the concentration of the M1 increases and the concentration of the M2 decreases as away from the center of the core; and
   the M1 is selected from the group consisting of Fe, Co, Ni, Mn and a combination thereof, and the M2 is selected from the group consisting of Mn, Ni, Co, Fe and a combination thereof.

5. The cathode active material for a lithium secondary battery according to claim 1, wherein the core has a diameter of 5 μm to 20 μm.

6. The cathode active material for a lithium secondary battery according to claim 1, wherein the shell has a thickness of 100 nm to 5 μm.

7. The cathode active material for a lithium secondary battery according to claim 1, which further comprises a carbon-coated layer on the surface of the shell.

8. The cathode active material for a lithium secondary battery according to claim 7, wherein the carbon-coated layer has a thickness of 10 nm to 200 nm.

9. The cathode active material for a lithium secondary battery according to claim 1, which has a diameter of 5 μm to 25 μm.

10. The cathode active material for a lithium secondary battery according to claim 1, which has a tap density of 1 g/cm$^3$ to 2 g/cm$^3$.

11. A lithium secondary battery comprising:
   a cathode including a cathode active material;
   an anode including an anode active material; and
   an electrolyte,
wherein the cathode active material is the cathode active material for a lithium secondary battery of claim 1.

* * * * *